United States Patent
Rüger et al.

(10) Patent No.: US 11,822,321 B2
(45) Date of Patent: Nov. 21, 2023

(54) COORDINATE MEASURING MACHINE MEASUREMENT AND ANALYSIS OF MULTIPLE WORKPIECES

(71) Applicant: Carl Zeiss Industrielle Messtechnik GmbH, Oberkochen (DE)

(72) Inventors: Oliver Rüger, Dresden (DE); Miroslawa Lukawska, Charlottenlund (DE); Daniel Görsch, Dresden (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 17/332,930

(22) Filed: May 27, 2021

(65) Prior Publication Data

US 2021/0382465 A1 Dec. 9, 2021

(30) Foreign Application Priority Data

May 28, 2020 (EP) .................................. 20 177 245

(51) Int. Cl.
*G05B 19/41* (2006.01)
*G05B 19/418* (2006.01)
(Continued)

(52) U.S. Cl.
CPC ....... *G05B 19/41875* (2013.01); *G01B 5/008* (2013.01); *G01B 11/005* (2013.01); *G01B 5/0025* (2013.01); *G05B 2219/32368* (2013.01)

(58) Field of Classification Search
CPC .... G05B 19/41875; G05B 2219/32368; G05B 2219/32077; G05B 2219/32201;
(Continued)

(56) References Cited

U.S. PATENT DOCUMENTS 5,576,492 A * 11/1996 Phalin .................... G01N 29/26
73/634
6,264,824 B1 * 7/2001 Reid ...................... G01N 27/26
205/775.5
(Continued)

FOREIGN PATENT DOCUMENTS

| CN | 107220216 A | 9/2017 |
| DE | 102016005949 A1 | 12/2016 |
| WO | WO-9942811 A1 | 8/1999 |

OTHER PUBLICATIONS

"Robotic manipulation in dimensional measurement", Samir Lemes et al, IEEE, 2013 XXIV International Conference on Information Communication and Automation Technologies (ICAT), Oct. 30-Nov. 1, 2013; https://ieeexplore.ieee.org/stamp/stamp.jsp?tp=&arnumber=6684085. (Year: 2013).*
(Continued)

*Primary Examiner* — Catherine T. Rastovski
*Assistant Examiner* — Lal C Mang
(74) *Attorney, Agent, or Firm* — Miller Johnson

(57) ABSTRACT

A method evaluates a sample of measurement data from measuring multiple workpieces by at least one coordinate measuring machine. A system of statistical distributions describes a frequency of measurement data values. The distributions are distinguishable based on skewness and kurtosis. The method includes defining a set of statistical distributions that are able to describe a frequency of measurement data values in the entire value interval from the system of statistical distributions for a value interval of the measurement data, which is a specified value interval or a value interval of the measurement data actually arising in the sample. The method includes ascertaining the skewness and the kurtosis from the sample of measurement data corresponding to a first statistical distribution. The method includes checking, using the ascertained moment values, whether the defined set contains a statistical distribution that has the ascertained skewness and kurtosis, and producing a corresponding test result.

27 Claims, 15 Drawing Sheets

(51) Int. Cl.
*G01B 5/008* (2006.01)
*G01B 11/00* (2006.01)
*G01B 5/00* (2006.01)

(58) Field of Classification Search
CPC .......... G05B 2219/32194; G05B 13/04; G01B 5/008; G01B 5/0025; G01B 11/005; Y02P 90/02; G06K 9/6226; G06F 17/11
See application file for complete search history.

(56) References Cited

U.S. PATENT DOCUMENTS

| | | | |
|---|---|---|---|
| 2013/0030773 A1* | 1/2013 | O'Hare | G06F 17/50 703/1 |
| 2016/0225389 A1* | 8/2016 | Jinnai | G10L 25/84 |

OTHER PUBLICATIONS

Segreto et al.; Feature Extraction and Pattern Recognition in Acoustic Emission Monitoring of Robot Assisted Polishing; Procedia Corp; Dec. 1, 2015; pp. 22-27; vol. 28; Netherlands.

Reinboth; Basics of Statistics: Skewness and Kurtosis; Nov. 17, 2016; pp. 1-10.

Extended European Search Report for EP App No. 20177245.6; dated Nov. 20, 2020; 18 Pages.

Anonymous, "Pearson distribution—Wikipedia", Jan. 20, 2020, pp. 1-12; XP055888197; retrieved on Feb. 7, 2022 <https://web.archive.org.web/20200120071758/https://en.wikipedia.org/wiki/Pearson distribution>.

Lothar Weise: "Berechnungsgrundlagen zur Fehlerstatistik in der Kernstrahlungsmeßtechnik, Teil VI", (ATM) Archiv Für Technisches Messen, Bd. 21, Nr. 383, Dec. 1, 1967, pp. 267-272, XP001428439.

\* cited by examiner

COORDINATE MEASURING MACHINE MEASUREMENT AND ANALYSIS OF MULTIPLE WORKPIECES

CROSS-REFERENCE TO RELATED APPLICATIONS

This application claims priority to European Pat. App. No. 20177245.6 filed May 28, 2020, the entire disclosure of which is incorporated by reference.

FIELD

The present disclosure relates to industrial metrology and more particularly to evaluating or preparing an evaluation of a sample of measurement data from measuring a multiplicity of workpieces using a coordinate measuring machine.

BACKGROUND

The concept of statistical process control is known from the field of quality control of processes for producing and/or processing workpieces and arrangements of workpieces. A statistical distribution on the basis of which it is possible, in particular, to make statements about the frequency of certain measurement values generated from a process is obtained by statistical modeling of the process. By way of example, the process being controllable may be the result of the statistical modeling. The process's quality meeting the specifications may also or alternatively be determined as a result of the statistical modeling, particularly if the variance of the measurement values is low.

Usually, such a statistical model is created by virtue of using information based both on knowledge of the process and on the evaluation of measurement data obtained. By way of example, when measuring a radius of the workpiece, the process is known to be describable by a normal distribution. In this case, the measurement values from measuring a multiplicity of workpieces of the same type are scattered randomly about an expected value. The normal distribution allows parameters, like the variance, in particular, to be determined therefrom.

It is not possible to sensibly describe the results of every process using a normal distribution. Rather, there are other statistical distributions that describe the frequency of the measurement values of a measurement variable as a function of the measurement value. Unlike in the case of a normal distribution, the distributions may only be suitable, in particular, for the statistical description of measurement values within a value interval that is limited on one side or on both sides. Such a distribution assigns no frequency to values outside of the value interval and/or the frequency, and hence probability for values outside of the value interval, is set to a value of zero.

By way of example, the Pearson distribution system is a system of a plurality of known and frequently used statistical distributions. If a sample of measurement data now is available for a measurement value, it is possible to select one of the statistical distributions of the distribution system and use said statistical distribution for statistical modeling. This is based on the basic concept of creating a distribution exclusively from information from the data available. Different procedures can be chosen for the purposes of creating the statistical distribution. In particular, it is possible to follow the maximum likelihood principle, i.e., maximize the probability of the distribution correctly describing the statistics of the available data.

According to a different procedure, the so-called moments of the statistical distribution can be ascertained from the measurement data and a distribution fitting to these moments can subsequently be selected. A situation possibly arising within the scope of statistical modeling using a distribution that is based on measurement data or data derived therefrom is that the distribution describes the frequency of the measurement values or the values derived therefrom well over a large part of the arising or possible value interval, but values also lie outside or may also lie outside of the value interval that is describable by the distribution. In practice, this is disadvantageous in that the statistical distribution is not modeled optimally and users may experience the undesirable case where measurement values arising do not fall within the value interval of the distribution and therefore do not contribute to the distribution or cannot be predicted by the distribution. There is an obvious modeling error in this case.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is an object of the present invention to specify a method and an arrangement for evaluating or for preparing an evaluation of a sample of measurement data from measuring a multiplicity of workpieces, using which measurement data are able to be statistically modeled with a high quality.

The solution is based on the basic idea of a check being carried out for a first statistical distribution or for a family of first statistical distributions, by means of which it is possible to statistically describe a sample of measurement data, as to whether this is suitable/these are suitable for describing the frequency of measurement data values as a function of the measurement data values within a specified value interval or within a value interval of the measurement data actually arising in the sample.

To carry out the check, there is a first evaluation of the sample of the measurement data. Further, the result of the check immediately aids the evaluation of the sample of measurement data since a statistical distribution that is unsuitable for modeling the sample over the entire value interval can be identified as being such a distribution. In particular, this allows a more suitable statistical distribution to be ascertained.

Further steps of the evaluation of the sample, specifically the ascertainment of parameters of the distribution suitable for statistical modeling of the sample in particular, can be further constituent parts of the method for evaluating the sample. The suitable statistical distribution represents a further possible result of the evaluation of the sample. Determining that the first statistical distribution is not suitable for statistical modeling of the sample over the entire specified or actually arising value interval of the measurement data also represents a possible result of the evaluation of the sample.

In particular, the measurement data can be measurement data that are obtained by way of measuring the workpieces by one or more coordinate measuring machines. The type of the coordinate measuring machines is not restricted to any particular type. Provided the measurement values are comparable, it is also possible to use different coordinate measuring machines and/or different types of coordinate measuring machine for the purposes of producing the measurement data contained in the sample. Examples of types of coordinate measuring machines are portal- or gantry-type coordinate measuring machines, coordinate measuring machines with an articulated arm, robots or machine tools comprising at least one measurement sensor and apparatuses comprising an optical measurement sensor, in particular, or else any other type of measurement sensor, with the measurement sensor being fixedly positioned in the measurement space. By way of example, an arrangement of cameras can also be used to measure a complex workpiece in such a way that a profile of the surface of the workpiece is ascertained in a coordinate system of the workpiece or of the measurement space. From this, it is possible in particular to ascertain positions of surface points or surface regions of the workpiece in turn.

Different types of measurement sensors are suitable for producing the measurement data. By way of example, tactile sensors and/or optical sensors are used on conventional coordinate measuring machines in particular. Sensors measuring in contactless fashion are, e.g., distance sensors and/or imaging sensors such as cameras. Distance sensors can operate according to different measurement principles, examples including capacitive sensors, inductive sensors, time-of-flight sensors such as TOF cameras (time-of-flight cameras) and/or chromatic confocal sensors. Further, at least one sensor of the coordinate measuring machine can be moved by means of a drive apparatus and the position of the measurement sensor, as ascertained from a scale system of the coordinate measuring machine, can be included in the determination of the workpiece coordinates.

The above-described coordinate measuring machines and measurement sensors are merely examples. In general, the measurement data of workpieces can be produced in any desired way. In particular, the measurement data are coordinates of at least some of the workpiece surface and/or of the workpiece interior. Coordinates of, e.g., cavity boundaries or transitions of different materials can be ascertained, for example, by means of invasive measurement methods such as passing x-ray radiation or different invasive radiation through the workpiece from different directions and subsequently carrying out a computer-assisted reconstruction (e.g., CT methods). In particular, the measurement data can also be measurement data such as radii, lengths, roundness, and curvature, which are derived from at least one coordinate and, for example, from a plurality of coordinates of the respective workpiece. Such derived data which, in particular, corresponds to a plurality of coordinates of the respective workpiece can also be determined directly by means of special measuring devices without the explicit determination of the coordinates. By way of example, camera images allow the roundness or the diameter of a cylindrical region of a workpiece to be determined. Measuring devices with tactile sensors that directly determine such derived measurement variables are also known.

Further, the measurement data can be or contain measurement data derived from the raw data produced by the respective measuring device or the measurement arrangement. Thus, for example, the raw data obtained from measuring a multiplicity of similar workpieces can be combined to form a mean value and/or outliers, i.e., nonsensical or implausible values, can be eliminated from or corrected in the raw data.

The multiplicity of workpieces which when measured form the basis for the measurement data can be, in particular, simple workpieces or complex workpieces which are assembled from a plurality of workpieces in turn. All that is required is for comparable measurement values or values derived therefrom to be available during the evaluation. Therefore, a workpiece is understood to mean a simple component such as a screw or a pin and an assembled workpiece or an irregularly shaped workpiece such as a door of a motor vehicle and a machine or another arrangement of workpieces.

A sample of measurement data is understood to mean any selection and/or any processing result of measurement data available and/or the entirety of the measurement data. The measurement data form the basis for the statistical description or modeling.

As mentioned, it is possible and proposed within the scope of the invention to carry out a check for the sample as to whether a first statistical distribution is suitable for the statistical description. In particular, the first statistical distribution can be created exclusively on the basis of the sample. However, only ascertaining certain properties of the first statistical distribution is sufficient for the check. As described in more detail below, all the first statistical distribution requires is for certain moments of the distribution to be ascertainable. Optionally, there can be a preselection of a distribution type, such as, e.g., a distribution from the Pearson distribution system. However, the first statistical distribution can also be a distribution that is not part of the system of statistical distributions which serves as a basis for an optionally ascertained second statistical distribution.

The term moments of a statistical distribution is a specialist term from statistics. Usually, the moments include the expected value, the variance and the skewness and the kurtosis. These moments and optionally present higher order moments can be used as characteristics for the respective statistical distribution.

It is now proposed to define a set of all those statistical distributions that are able to describe a frequency of measurement data values in the entire value interval from a system of statistical distribution for the aforementioned value interval of the measurement data, which is a specified value interval or a value interval of the measurement data actually arising in the sample. The frequency or probability of a measurement data value in general being zero or undefined in each manifestation of the statistical distribution is not understood to be a description of the frequency in this case. Actual or possible occurrences of this measurement data value would not be adequately described by means of a probability value or frequency value of zero. At least one exemplary embodiment as to how the set of the statistical distributions suitable for describing the frequency of the entire value interval can be ascertained or defined is discussed below. This definition of the set of suitable statistical distributions can in each case occur when a first statistical distribution for a sample is also produced and/or the first statistical distribution is characterized in terms of its suitability for preparing the check. However, for as long as the value interval of the measurement data is the same for various samples, it suffices to define the set once since the set only depends on the value interval and not on the frequency or probability of the measurement data values of the sample. In particular, the set of suitable statistical distributions can be defined before, during and/or after the generation or characterization of the first statistical distribution for the sample.

In particular, a boundary of the set can be ascertained from the value interval when defining the set of all those statistical distributions that are able to describe a frequency of measurement data values in the entire value interval. The set can be uniquely ascertained from the boundary.

It was already mentioned that the first statistical distribution need not necessarily belong to the system of statistical distributions even though it may belong thereto in one configuration. However, it is necessary for a moment value of the skewness and the kurtosis corresponding to the first statistical distribution to be ascertainable in each case in order to characterize these or a family of first statistical distributions with the same value of the skewness and the same value of the kurtosis.

To be able to check whether the set of suitable statistical distributions contains a distribution suitable for the sample of measurement data, a moment value of the skewness and the kurtosis corresponding to the first statistical distribution is now ascertained in each case.

There are various options for ascertaining a moment value of the skewness and the kurtosis corresponding to the first statistical distribution. Firstly, values of the skewness and the kurtosis can initially be ascertained directly from a sample of measurement data. Optionally, a corresponding first statistical distribution can then be specified in more detail, for example by specifying the corresponding probability density function, which has the same values of skewness and of kurtosis as characteristics. In particular, it is possible here to proceed according to the process of defining the statistical distribution in accordance with its moments.

A further option consists of ascertaining a first statistical distribution which statistically models the measurement data of the sample, for example according to the process of maximizing the probability of the first statistical distribution correctly modeling the measurement data of the sample. It is then possible to ascertain the values of the skewness and the kurtosis of the first statistical distribution.

If the first statistical distribution is not part of the system of statistical distributions, however, a statistical distribution which has the same values of the skewness and the kurtosis and which statistically models the respective measurement data in a suitable manner may be chosen or may exist within the system. For simplification purposes, it is therefore possible to assume, for example, that the statistical distribution within the system which has the values of the skewness and the kurtosis ascertained from the sample of measurement data statistically models the measurement data in a suitable manner. At this point, "statistically modeling in a suitable manner" does not yet necessarily mean that the distribution models the measurement data over the entire value interval of the measurement data. This is still checked.

Now, the ascertained moment values of the skewness and the kurtosis are used to check whether the defined set contains a statistical distribution which has the ascertained moment values of the skewness and the kurtosis. A corresponding test result is produced and optionally output. In particular, the test result can consist of a statistical distribution with the ascertained values of the skewness and the kurtosis existing within the defined set. In this case, the first statistical distribution can be used as a suitable statistical distribution for modeling the measurement data values over the entire value interval if said first statistical distribution belongs to the system of distributions. If the first statistical distribution has not yet been fully produced by the time the check is carried out this can now be remedied. If the first statistical distribution does not belong to the system or if the values of the skewness and the kurtosis were ascertained directly from the sample of measurement data, the distribution which is contained in the system and which has the ascertained values of the skewness and the kurtosis can be used as a suitable statistical distribution for modeling the measurement data values over the entire value interval.

However, the test result can also consist of the ascertained moment values of the skewness and the kurtosis not belonging to any statistical distribution within the defined set of suitable distributions. In this case, the test result states that the first statistical distribution or the family of the first statistical distributions is not suitable. In this case, it is not necessary to produce the first statistical distribution completely in all its details required for statistical modeling. In particular, it is not necessary to specify a functional equation of the statistical distribution which describes the frequency or the probability of the occurrence of the measurement data values as a function of the measurement data values. In this case, it is preferable for the test result to be output and/or for this to trigger the ascertainment of a suitable, second statistical distribution.

Value pairs of the skewness and the kurtosis of statistical distributions of the system, which correspond to the set, can be ascertained from the value interval when defining the set of all those statistical distributions that are able to describe a frequency of measurement data values in the entire value interval. Consequently, a relationship is established between the value interval and the skewness and the kurtosis of statistical distributions of the system. The value pairs which were ascertained with the information about the boundaries of the value interval, in particular, likewise form a set. However, for reasons of clarity, the term set shall only be used in relation to the suitable statistical distributions.

In particular, a boundary curve in a plane spanned by the skewness and the kurtosis of statistical distributions of the system can be ascertained from the value interval when defining the set of all those statistical distributions that are able to describe a frequency of measurement data values in the entire value interval. This plane can also be referred to as Pearson plane if the system of the distributions is a Pearson distribution system. The value pairs of the skewness and the kurtosis on the boundary curve and on one side of the boundary curve then correspond to the set of suitable statistical distributions of the system. In particular, this allows a simple determination on the basis of specific values of the skewness and the kurtosis as to whether a statistical distribution is suitable for statistically modeling measurement data over the entire value interval.

An example of a system of statistical distributions is the Pearson distribution system, wherein there are variants in respect of the number of distributions belonging to the system. By way of example, there is a variant with eight types of distributions and there are variants with more than eight types, for example twelve types, of distributions, with some of the twelve types being subtypes of the eight types.

It is preferred if the sample and/or the first statistical distribution is/are standardized to the case where the expected value is zero and the variance is one. In the case of a given sample or distribution, this is rendered possible by virtue of displacing the measurement values or the distribution to the expected value of zero and dividing the measurement values or the argument of the probability density function by the standard deviation. By way of example, if a statistical distribution suitable for statistical modeling over the entire value interval of the sample has then been ascertained, the measurement values or the argument of the probability density function can be multiplied by the standard deviation and the displacement to the expected value of zero can be reverted by a displacement in the reverse direction. As a result, a statistical distribution which is suitable for modeling and which has the correct expected value and the correct variance is then obtained. However, it is not necessary to undertake such a standardization. In particular, the outlay for defining the set of all those statistical distributions that are able to describe a frequency of measurement data values in the entire value interval then is higher, however.

In particular, a method is proposed for evaluating a sample of measurement data from measuring a multiplicity of workpieces, wherein a system of statistical distributions is in existence or is set up, said statistical distributions being able to describe a frequency of measurement data values as a function of the measurement data values, wherein examples of the system of statistical distributions are distinguishable from one another by respectively one moment value of two moments, specifically a skewness and a kurtosis, of the respective statistical distribution, and wherein
a set of all those statistical distributions that are able to describe a frequency of measurement data values in the entire value interval is defined from the system of statistical distributions for a value interval of the measurement data, which is a specified value interval or a value interval of the measurement data actually arising in the sample,
a respective moment value of the skewness and the kurtosis is ascertained from the sample of measurement data corresponding to a first statistical distribution,
the ascertained moment values are used to check whether the defined set contains a statistical distribution which has the ascertained moment values of the skewness and the kurtosis, and a corresponding test result is produced.

Moreover, an arrangement is proposed for evaluating a sample of measurement data from measuring a multiplicity of workpieces, wherein a system of statistical distributions is in existence or is set up, said statistical distributions being able to describe a frequency of measurement data values as a function of the measurement data values, wherein examples of the system of statistical distributions are distinguishable from one another by respectively one moment value of two moments, specifically a skewness and a kurtosis, of the respective statistical distribution, and wherein the arrangement comprises:
a definition device configured to define a set of all those statistical distributions that are able to describe a frequency of measurement data values in the entire value interval from the system of statistical distributions for a value interval of the measurement data, which is a specified value interval or a value interval of the measurement data actually arising in the sample,
a moment ascertainment device configured to ascertain a respective moment value of the skewness and the kurtosis from the sample of measurement data corresponding to a first statistical distribution,
a checking device configured to use the ascertained moment values to check whether the defined set contains a statistical distribution which has the ascertained moment values of the skewness and the kurtosis, and to produce a corresponding test result.

The scope of the invention also includes a method for preparing an evaluation of a sample of measurement data from measuring a multiplicity of workpieces, wherein a system of statistical distributions is in existence or is set up, said statistical distributions being able to describe a frequency of measurement data values as a function of the measurement data values, wherein examples of the system of statistical distributions are distinguishable from one another by respectively one moment value of two moments, specifically a skewness and a kurtosis, of the respective statistical distribution, and wherein
a set of all those statistical distributions that are able to describe a frequency of measurement data values in the entire value interval is defined from the system of statistical distributions for a value interval of measurement data, which is a specified value interval or a value interval of a sample, to be evaluated, of measurement data,
a statistical distribution is ascertained from the set.

Configurations of the arrangement correspond to configurations of the method so that, in particular, the configurations of the method described below in each case also correspond to a configuration of the arrangement.

In particular, the statistical distribution ascertained thus can be used for statistical modeling of the measurement data of a sample in a further step of the method or during the operation of the arrangement. However, no sample of measurement data need be present yet and no measurement data need be present yet either when preparing the evaluation. By way of example, the value interval can be specified without any relation to specific measurement data. Alternatively, the value interval can be defined for specific, albeit not yet available measurement data. Naturally, the method for preparing the evaluation and the arrangement for preparing the evaluation also however relate to the case where specific measurement data and possibly the sample to be evaluated as well are already present.

The preparation of the evaluation is based on the same idea as the above-described evaluation of the measurement data with a check as to whether a first statistical distribution is suitable for modeling a sample of measurement data over the entire value interval. This idea consists of defining a set of all those statistical distributions that are able to describe a frequency of measurement data values in the entire value interval from the system of statistical distributions for the value interval of measurement data.

Preferably, a statistical distribution is uniquely ascertained from the set in accordance with a given rule, i.e., the statistical distribution emerges uniquely from the given rule.

In particular, the specified rule only says to ascertain that statistical distribution from the system of distributions which is defined exactly for the specified value interval; i.e., in relation to the terms used in the description of the figures, the support of the distribution equals the range of the sample of measurement data. However, depending on the boundaries of the value interval, there are cases in which such a unique ascertainment is not possible. However, such a unique ascertainment of a statistical distribution is possible if the boundaries of the value interval satisfy two conditions. The first condition is that the left boundary of the value interval is at a smaller value than the right boundary of the value interval. The second condition is that the left boundary multiplied by the right boundary is less than the value of −1. Should the second condition not be satisfied, the value pair of the skewness and the kurtosis of the unique result of the rule lies in the "forbidden region", which will be described in more detail in the description of the figures. In that case, the result is inadmissible.

The invention relates to the evaluation of a sample of measurement data from measuring a multiplicity of workpieces and/or the preparation for the evaluation. Even if this does not fall under the scope of protection of the attached claims, the invention can also be applied to the evaluation of a sample of measurement data from measuring other measurement objects. This applies both to the method and to the arrangement and the computer program. This also applies to all configurations and exemplary embodiments described in this description. Therefore, people or animals, for example, may come into question as measurement objects and the evaluation and/or the preparation thereof relates to corresponding measurement data.

To elucidate the distributions for which a skewness and a kurtosis are determinable as moments of the distribution, it is possible to draw a two-dimensional diagram in which values of the skewness are able to be plotted in the direction of a first axis (e.g., x-axis) and values of the kurtosis are able to be plotted along a second axis (e.g., y-axis) which extends at an angle and, in particular, at a right angle to the first axis. Each point in the plane of value pairs defined thus corresponds to a family of distributions, with the further moments of this family of distributions, such as the expected value and the variance, in particular, being different for the members of the family. Therefore, if a family of distributions corresponding to a specific value pair consisting of a specific value of the skewness and a specific value of the kurtosis is selected, then it is possible to ascertain a distribution within this family that corresponds the best to a specific sample, in particular in respect of expected value and variance. In the plane of the two-dimensional diagram, the defined set has, in particular, a boundary line to value pairs of distributions that do not belong to the defined set of suitable distributions, wherein the defined set lies on the side of larger values of the kurtosis at the boundary line.

According to one configuration of the method, a second statistical distribution is ascertained for the sample if it follows from the test result that the defined set does not contain a statistical distribution having the ascertained moment values of the skewness and the kurtosis, wherein the second statistical distribution is a statistical distribution contained in the defined set. In the case of a corresponding configuration of the arrangement, the latter has a device for ascertaining the second statistical distribution. The second statistical distribution is therefore suitable for describing the frequency or probability of the measurement data values over the entire specified value interval or the value interval of the sample.

In particular, it is possible to specify a rule which, when followed, ascertains a second statistical distribution contained in the defined set for any first statistical distribution or for the ascertained moment values of the skewness and the kurtosis. In the process, it is possible, in particular, to specify a rule which renders the second statistical distribution ascertainable in a unique manner; i.e., a second statistical distribution with different moment values of the skewness and the kurtosis follows uniquely from the ascertained moment values of the skewness and the kurtosis. By way of example, such a rule could state that the second statistical distribution has the same skewness value and is the distribution contained within the set whose kurtosis value differs as little as possible from the ascertained kurtosis value of the first statistical distribution. In relation to the aforementioned two-dimensional diagram, this means a displacement along the kurtosis axis until the region of the defined set has been reached. It is also possible for rules to be specified for various cases and for one of these rules not to be applicable in some cases and therefore render the application of a different one of the specified rules necessary.

A rule is advantageous in that reproducible results can be obtained and/or the second statistical distribution can be ascertained automatically. However, it is also possible to leave the selection of a second statistical distribution within the defined set to the discretion of a user.

In particular, a measure of distance is defined in each case for two statistical distributions which are able to describe a frequency of measurement data values as a function of the measurement data values. The measure of distance describes a distance between the two statistical distributions. In one configuration of the method, the second statistical distribution is ascertained in such a way that the value of the measure of distance of the first statistical distribution or a distribution corresponding to the first statistical distribution in the system of statistical distributions from the second statistical distribution is a minimum of the measure of distance of the distance of the first statistical distribution or the distribution corresponding to the first statistical distribution from the statistical distributions in the defined set. Expressed in a simplified fashion, the second statistical distribution is that distribution in the defined set which is closest to the first statistical distribution or the corresponding distribution. If the first statistical distribution is not part of the system of statistical distributions, then it is preferably the distance from the corresponding distribution in the system that is considered. By way of example, the first statistical distribution has the same value of the skewness and the kurtosis as the corresponding distribution in the system. However, particularly if the first statistical distribution is not part of the system of distributions, it is also possible to ascertain directly the distance thereof from a distribution belonging to the system and minimize the measure of distance of this distance in order to ascertain the second statistical distribution, which belongs to the system.

The measure of distance can be defined in different ways. One option consists of defining the measure of distance in relation to the distance in the aforementioned two-dimensional representation, i.e., in the plane of the skewness-kurtosis value pairs. In this case, the measure of distance can be the measure of the Euclidean distance in the plane of the value pairs, for example. Another option consists of defining the measure of distance in relation to the distance of the two probability density functions to be compared, in respect of the functional dependence of the frequency or probability of the measurement data values on the measurement data values. By way of example, the measure of distance can therefore be the integral of a power of the absolute value of the difference of the frequencies (or the probabilities) over the interval of the union of the definition range of the two statistical distributions or over a value interval specified for the integration. By way of example, the exponent of the power can be one or, preferably, two.

The defined measure of distance is an exemplary embodiment for the aforementioned specified rule, the rule in this case moreover containing that the first and the second statistical distribution have the minimum distance from one another or have at most a specified maximum value of the measure of distance.

Optionally, the production of the measurement data of the sample can also be a step of the method according to the invention. As an alternative or in addition thereto, the evaluation of the aforementioned second statistical distribution can be a step of the method according to the invention. By way of example, this evaluation step can contain determining whether the process within which the measured workpieces (the measurement data having been obtained by the measurement thereof) were produced and/or processed is capable and/or whether or not a specified quality criterion is satisfied. By way of example, the quality criterion can consist of at least one of the moments of the second statistical distribution satisfying a specified condition. By way of example, in respect of the variance of the statistical distribution (second moment), it may be specified that the variance is not greater than a specified value.

At least the ascertainment of the moment values of the skewness and the kurtosis from the sample of measurement data corresponding to a first statistical distribution and the check on the basis of the ascertained moment values as to whether the defined set contains a statistical distribution having the ascertained moment values of the skewness and the kurtosis, and the production of a corresponding test result can be carried out by executing a computer program on a computer or computer network. The preparation of an evaluation of a sample of measurement data from measuring a multiplicity of workpieces, the definition of the set of statistical distributions, and/or the ascertainment of a statistical distribution from the set can also be carried out by executing a computer program on a computer or computer network.

In particular, the computer program contains program instructions which, when the computer program is executed on the computer or on the computer network, prompt the computer or the computer network to carry out the method in one of the configurations described in this description. Therefore, particularly when carrying out the method for evaluating a sample of measurement data, it is possible that the moment ascertainment device and the checking device of the arrangement, in particular, are realized by a computer or a computer network with the computer program. The distribution ascertainment device can also be realized in this way. When preparing an evaluation of a sample of measurement data, it is possible, in particular, for the definition device and/or the distribution ascertainment device to be realized by a computer or a computer network with the computer program.

BRIEF DESCRIPTION OF THE DRAWINGS

The present disclosure will become more fully understood from the detailed description and the accompanying drawings.

DETAILED DESCRIPTION

Figure 1:
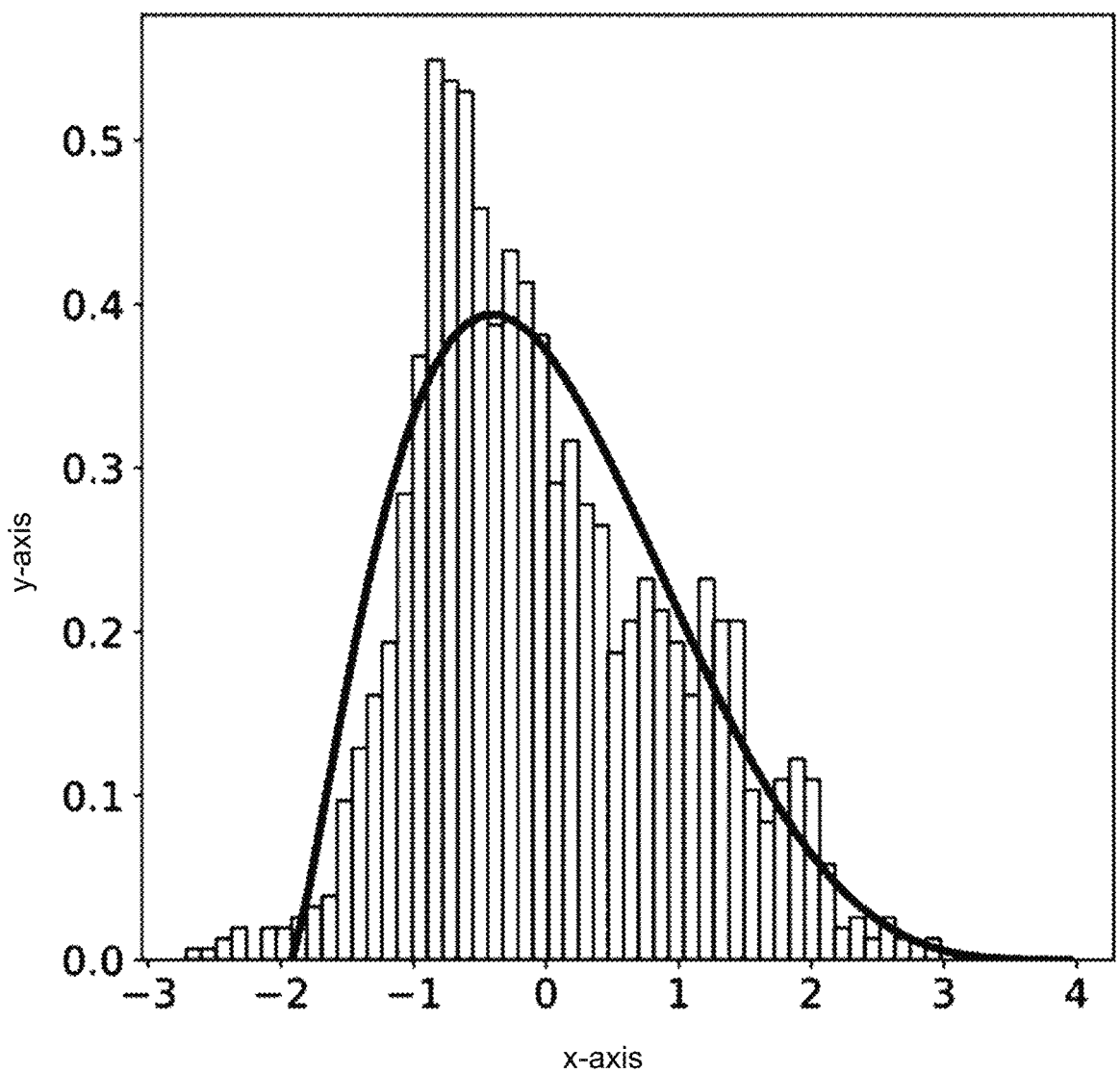
FIG. 1 shows, for an example sample of measurement data, a frequency distribution of the measurement values and a statistical distribution not suitable for describing the frequency distribution over the entire value interval of the sample.

In FIG. 1, the frequencies of measurement data values are represented in the form of bars, in each case for small partial intervals of the value interval of measurement data values of a sample of measurement data. Accordingly, the measurement data values are plotted along the horizontal axis and the frequencies or probabilities are plotted along the vertical axis. Further, FIG. 1 illustrates the function curve of a first statistical distribution which models the frequency distribution. It is evident that the first statistical distribution only models frequencies in a value interval bounded on the left side, the value interval starting at approximately the measurement data value of −1.9. However, the sample also contains measurement data values that are less than −1.9. Therefore, the first statistical distribution is not suitable for modeling the frequencies over the entire value interval of the sample.

By way of example, the value interval of the actually arising measurement data values or a larger value interval can be specified for the sample underlying FIG. 1 as the value interval in which a statistical distribution should be able to model the frequency or probability of the measurement data values. Below, this specified value interval is also referred to as the range.

By contrast, there is the value interval in which a statistical distribution can model the frequency or the probability of the measurement data values. Below, this value interval is also referred to as the support of the statistical distribution. In relation to the case illustrated in FIG. 1, the range is therefore not contained within the support. However, this is sought after.

As already mentioned above, moments can be assigned as characteristics to the statistical distributions of the Pearson distribution system in particular. Four of the moments are the expected value $v_1$, the variance $\mu_2$, the skewness $\tilde{\mu}_3$, and the kurtosis $\tilde{\mu}_4$. In relation to a random variable X, the n-th moment is given by:

$$v_n(X) = E(X^n)$$

The expected value arises by inserting. E denotes the expected value operator. The n-th central moment $\mu_n$ is given by:
From this, the corresponding equation for the variance $\mu_2$ can be obtained by inserting n=2. The n-th central, standardized moment $\tilde{\mu}_n$ is given by:

$$\tilde{\mu}_n = \frac{\mu_n(X)}{\mu_2(X)^{n/2}}, n \geq 2$$

From this, by inserting n=3 and 4, it is possible to obtain the corresponding equations for the skewness $\tilde{\mu}_3$ and the kurtosis $\tilde{\mu}_4$. As will still be justified elsewhere, the central, standardized moments of the skewness and the kurtosis are independent of the moments of the expected value and the variance, and so the check of the suitability of a statistical distribution for modeling a sample over the entire value interval and the ascertainment of a suitable statistical distribution, in each case with respect to the skewness and the kurtosis, can be undertaken for any expected values and any values of the variance and the results of the check or the ascertainment are valid. In the case of the standardization described elsewhere, care should be taken that the solution set is ascertained in respect of the standardized measurement values or the standardized statistical distribution.

Figure 2:
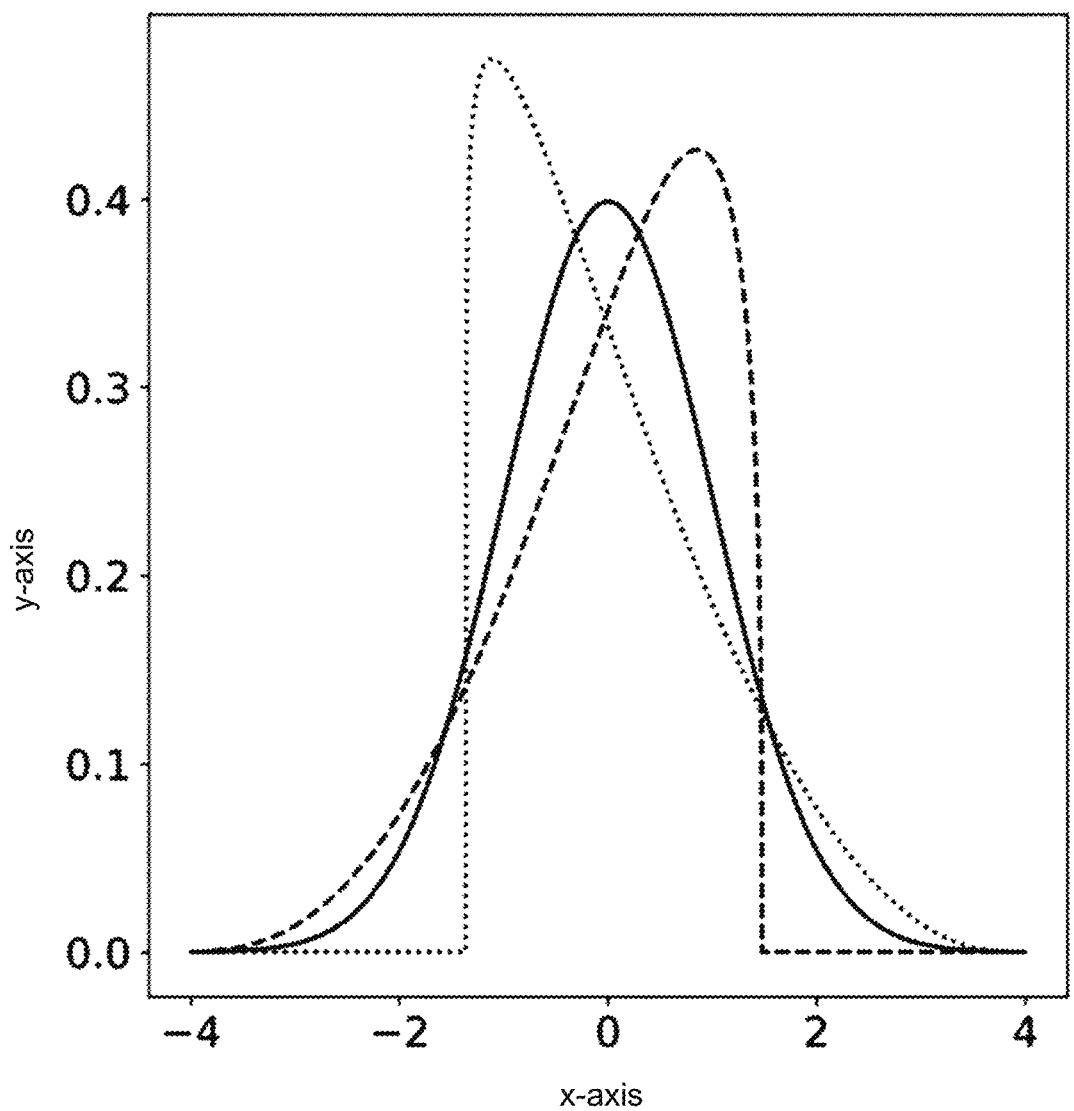
FIG. 2 shows examples of three different statistical distributions that differ from one another in respect of their skewness.
Figure 3:
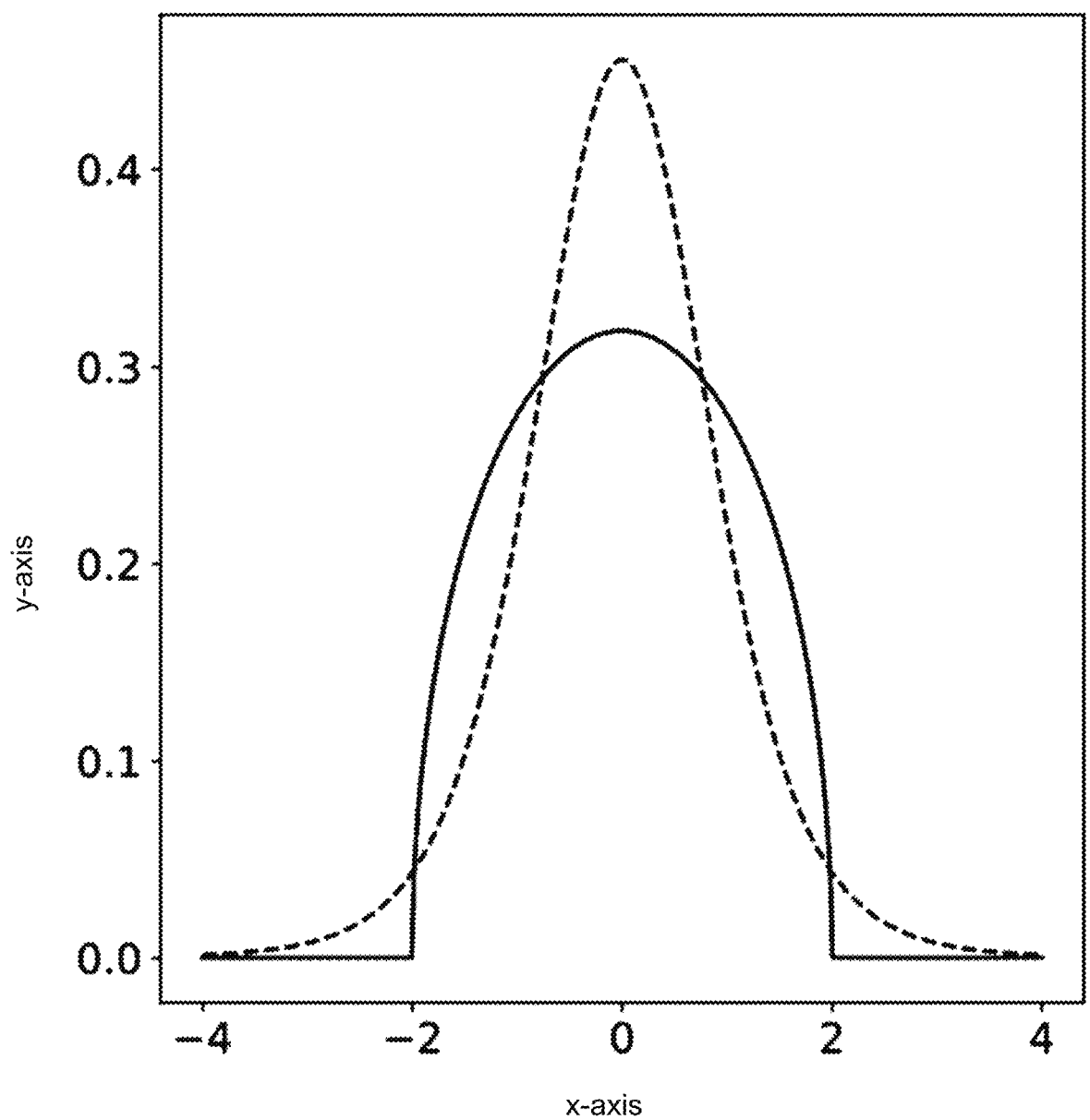
FIG. 3 shows examples of two different statistical distributions that differ from one another in respect of their kurtosis.

FIG. 2 shows three different statistical distributions that differ from one another in respect of their skewness. Here, the skewness of the probability density function illustrated by a solid line has a value of zero since the probability density function is symmetrical. The probability density function illustrated by a dashed line has a negative value of the skewness; the probability density function illustrated by a dotted line has a positive value of the skewness. FIG. 3 shows two different statistical distributions that differ from one another in respect of their kurtosis. The kurtosis only assumes positive values. The kurtosis of the probability density function illustrated by a dashed line is greater than the kurtosis of the probability density function illustrated by a solid line.

It is conventional to adapt the first two moments, the expected value and the variance, of a distribution. However, only the skewness and kurtosis are initially considered below; these allow each distribution or family of distributions to be identified uniquely.

Figure 4:
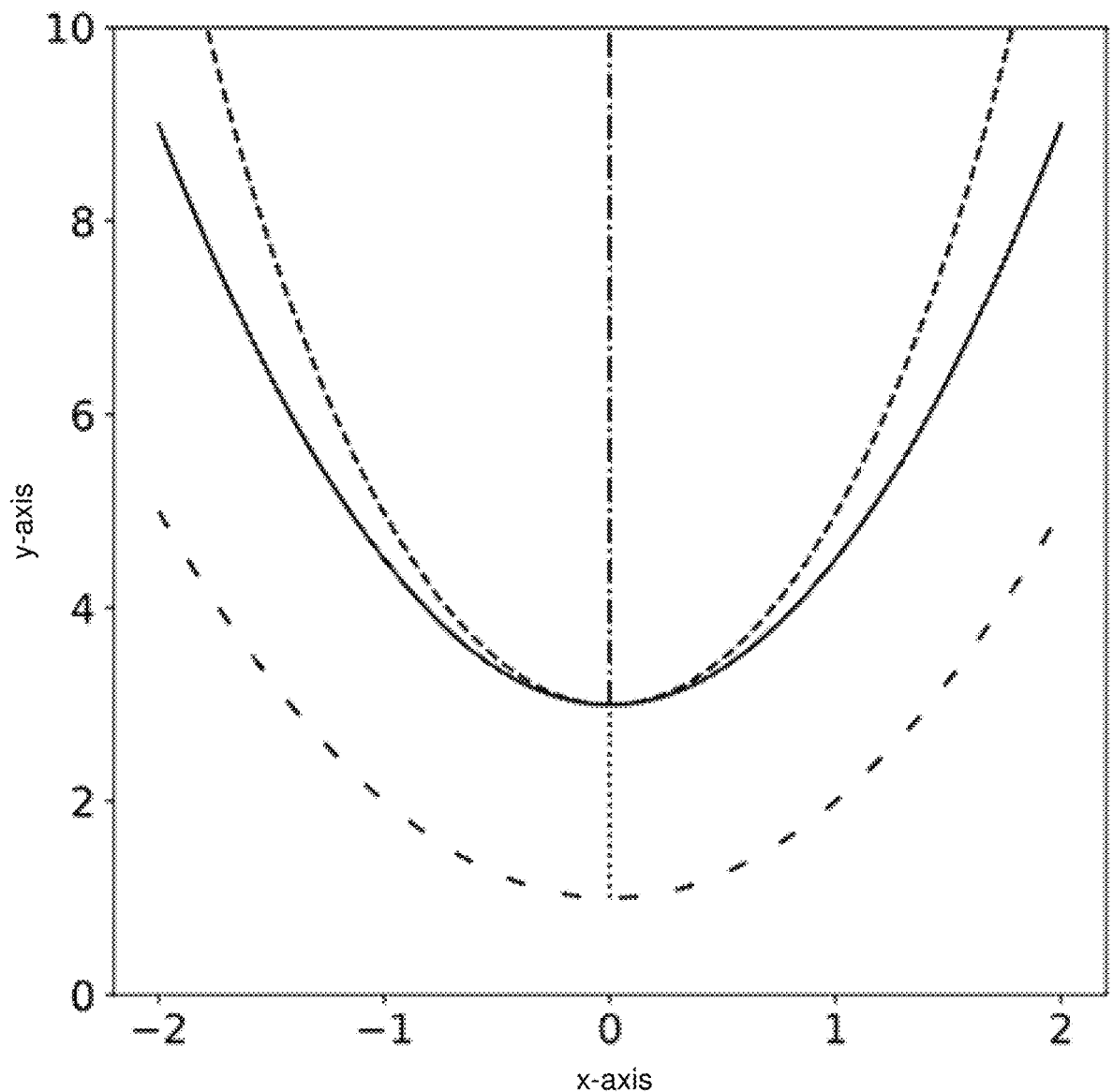
FIG. 4 shows an example of a plane whose points are defined by value pairs of the skewness and the kurtosis and which is referred to as Pearson plane, with the FIG. having regions of the plane which are respectively assigned to the eight types of a Pearson distribution system with eight distribution types, and the "forbidden region".

Specifically, a Pearson distribution system with eight types of distributions is considered in the example embodiment described below. For this system, FIG. 4 shows the so-called skewness-kurtosis plane, wherein, for one example embodiment, values of the skewness are plotted along the axis extending horizontally and values of the kurtosis are plotted along the axis extending vertically. The skewness-kurtosis plane is referred to as Pearson plane below. Each point of the Pearson plane outside of the forbidden region, which is defined by a coordinate pair consisting of a skewness coordinate and a kurtosis coordinate, is uniquely assigned to a distribution or a family of distributions. The members of the family still differ by the values of the further moments, such as the expected value and the variance in particular. There is a continuous relationship between the relative position in the Pearson plane and the form of the associated distribution or family of distributions. This applies not only directly in respect of the skewness and the kurtosis but also in respect of further properties, in particular of the value interval over which the family of distributions is suitable for statistically modeling samples or measurement data values and predicting their probability. Thus, if two points are close together in the Pearson plane, the associated two distributions are also similar if the same expected value and the same variance are assumed for the two distributions.

The example of the Pearson plane illustrated in FIG. 4 was created on the basis of a standardization in which the expected value has a value of zero and the variance has a value of one.

In FIG. 4, an approximately parabolic dashed line is evident at the bottom of the illustrated region of the plane. There are no associated distributions for value pairs of skewness and kurtosis lying below this line. The region of the plane lying below this line can therefore be referred to as inadmissible or forbidden region. In the case of the skewness value of zero, a dotted line extends parallel to the kurtosis axis from the aforementioned line to an approximately parabolic solid line. The value pairs on the dotted line belong to distributions of the Pearson type 2 distribution. Along the extension of the dotted line, a dash-dotted line extends parallel to the kurtosis axis and the value pairs thereof belong to distributions of the Pearson type 7 distribution. The value pairs of the aforementioned solid line belong to the Pearson type 3 distribution. A likewise parabolic dashed line is illustrated above the solid line, the points of the value pairs of the distributions of the Pearson type 5 distribution lying thereon. The value pairs of the points between the forbidden region and the solid line belong to distributions of the Pearson type 1 distribution. The value pairs of the points between the solid line and the upper dashed line belong to distributions of the Pearson type 6 distribution. The value pairs of the points above the upper dashed line belong to distributions of the Pearson type 4 distribution. Located at the common intersection or end of all of the aforementioned lines with the exception of the lower dashed line is the value pair of the only point of the distribution of the Pearson type 0 distribution, which is also known as the normal distribution.

Figure 5:
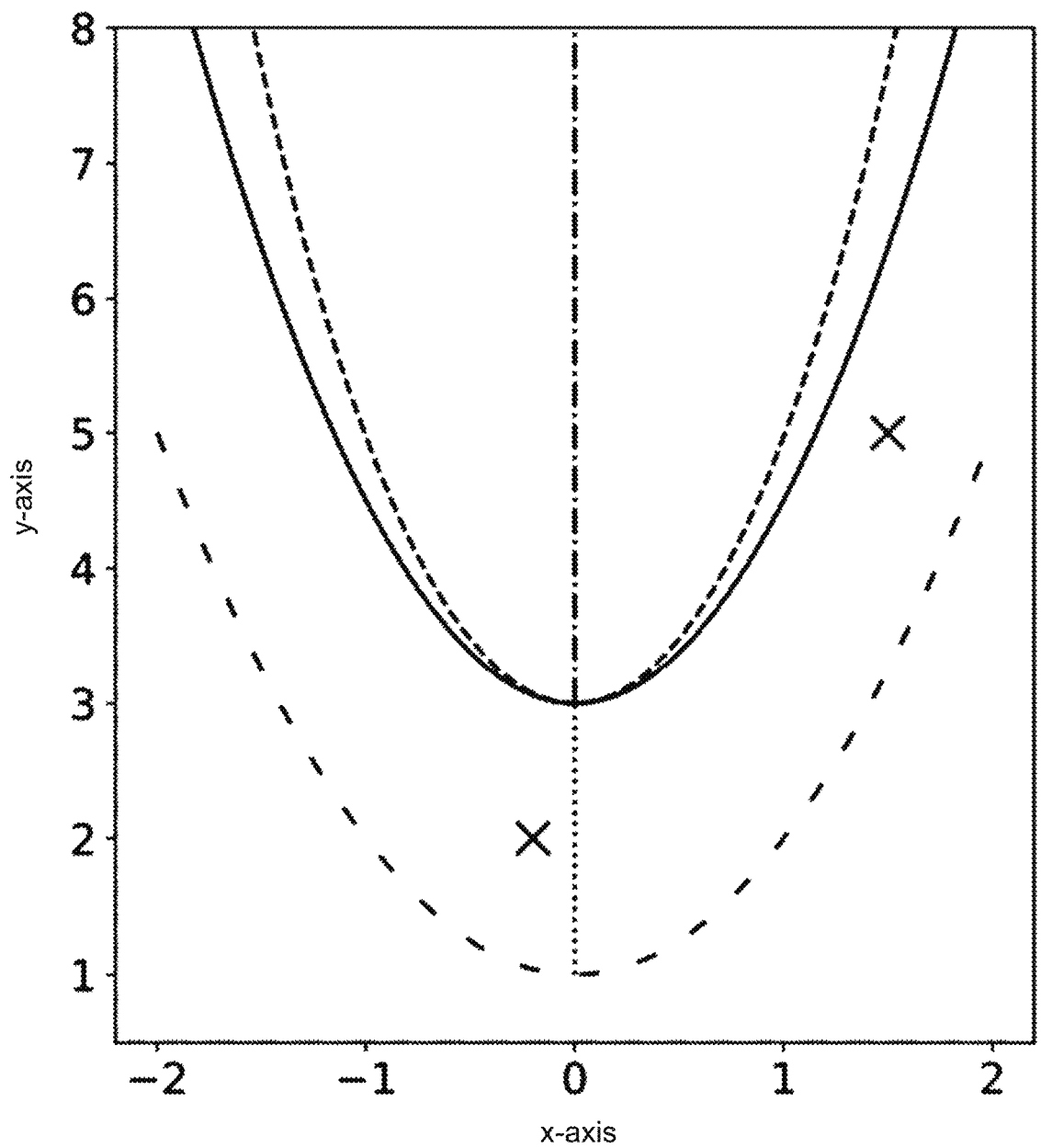
FIG. 5 shows a simplified representation with a section of the region of the Pearson plane illustrated in FIG. 4, with two specific points in the Pearson plane being labeled by a cross.
Figure 6:
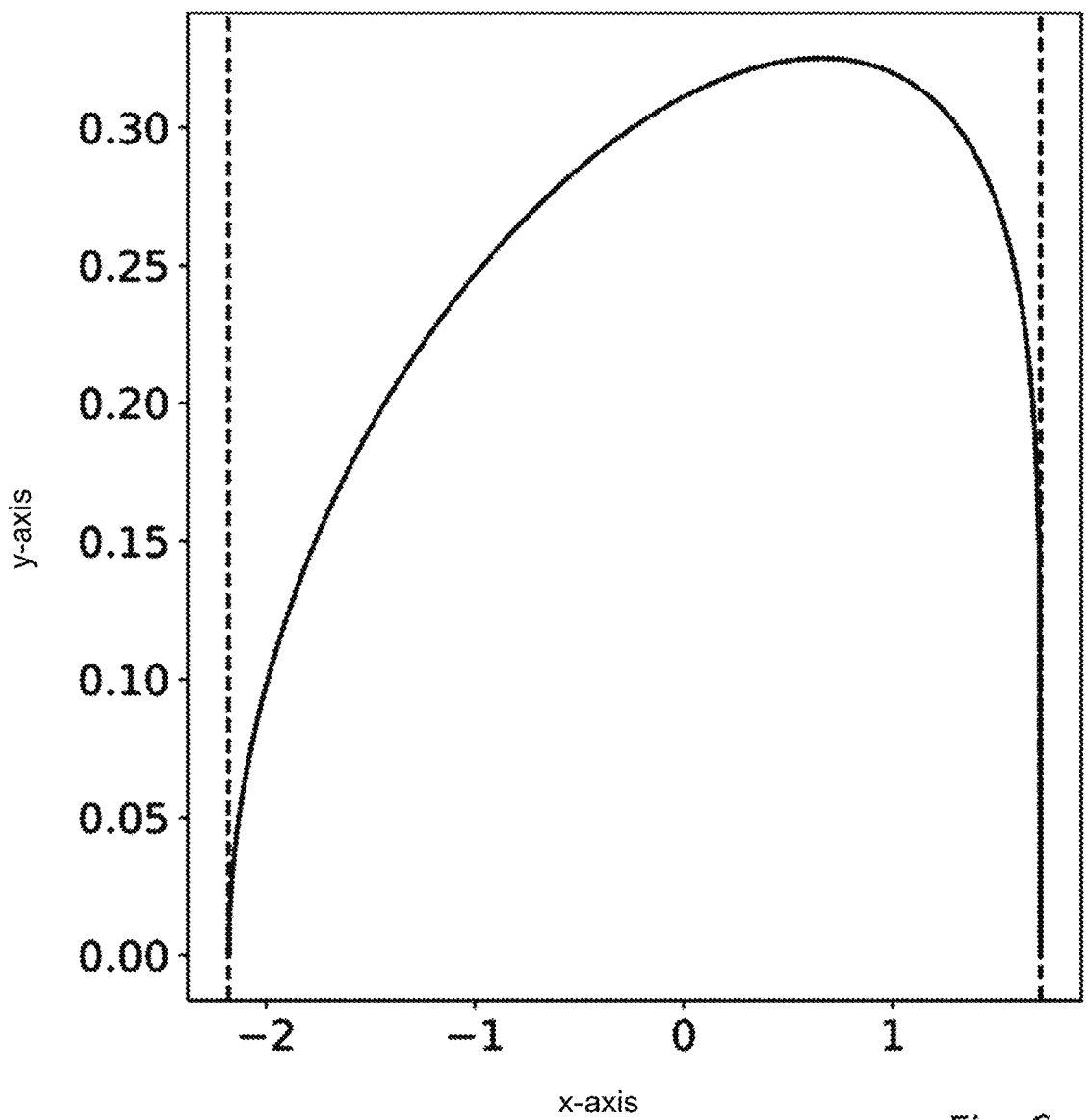
FIG. 6 shows a statistical distribution whose values of the skewness and the kurtosis correspond to the lower central point in FIG. 5 that is labeled by a cross.
Figure 7:
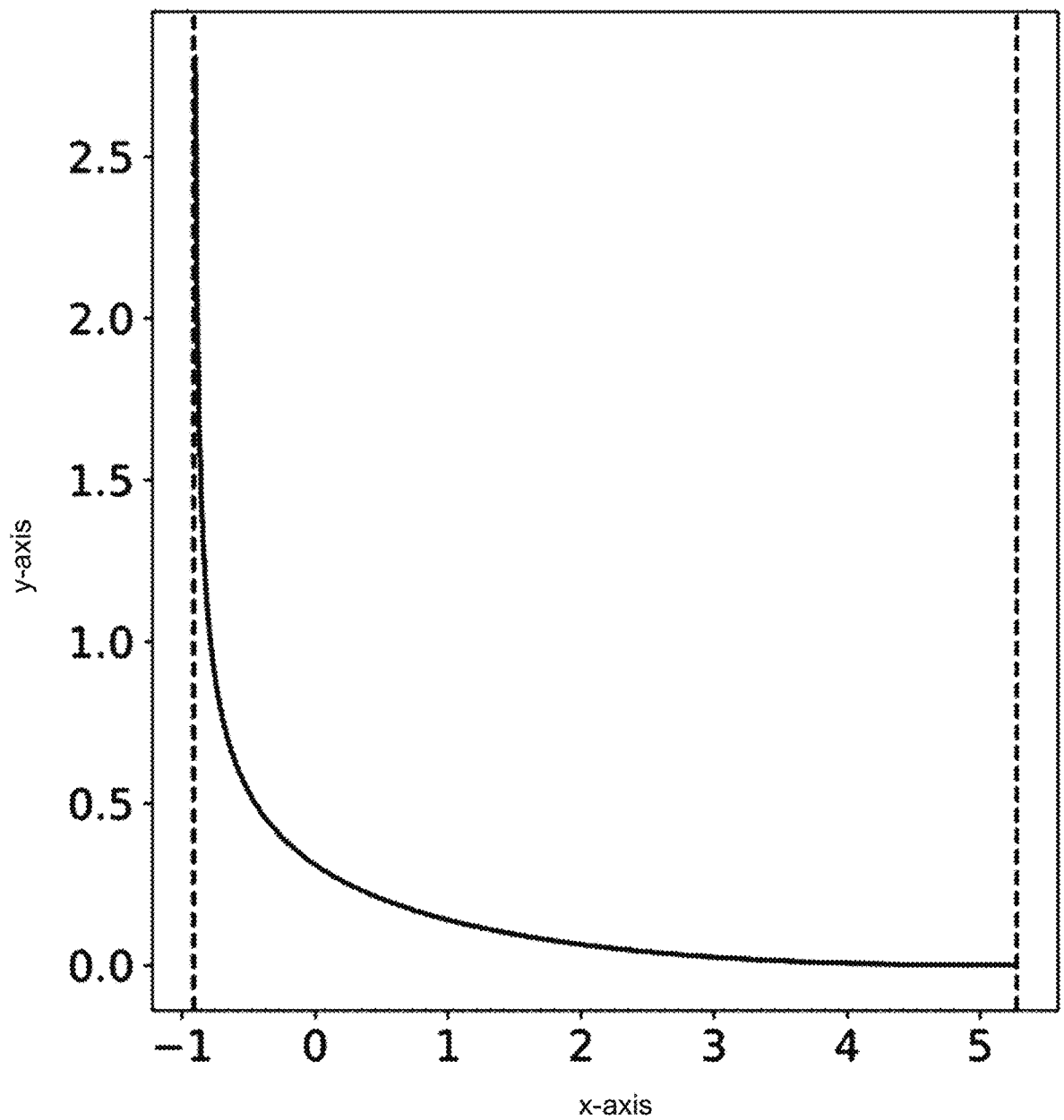
FIG. 7 shows a statistical distribution whose values of the skewness and the kurtosis correspond to the upper right point in FIG. 5 that is labeled by a cross, wherein the expected value and the variance of the statistical distributions illustrated in FIG. 6 and FIG. 7 have the same value, which also underlie the representation in FIG. 4 and FIG. 5.

In order to highlight two points in the plane, two crosses are plotted in the region of the Pearson plane illustrated in FIG. 5. The associated distributions are illustrated in FIG. 6 and FIG. 7. These two distributions belong to the Pearson type 1 distribution. The skewness of the distribution illustrated in FIG. 6 is negative and closer to the value of zero than the positive skewness of the distribution illustrated in FIG. 7. Therefore, this distribution looks more symmetrical than the distribution illustrated in FIG. 7. The kurtosis of the distribution illustrated in FIG. 7 has a positive value with a greater magnitude than the positive value of the distribution illustrated in FIG. 6.

The range of a sample represents an interval of the measurement data values. The distribution fitted to the sample is now required to have a support which at least contains the range of the interval. Thus, if the range is given by Range=$[r_{min}, r_{max}]$ and the support of the distribution is given by Support=$[v_{min}, v_{max}]$, then the following should apply:

Range⊆Support, i.e., the range should be completely contained within the support. This demand is equivalent to:

$$v_{min} \leq r_{min}, \quad (1)$$

$$v_{max} \geq r_{max}. \quad (2)$$

Figure 8:
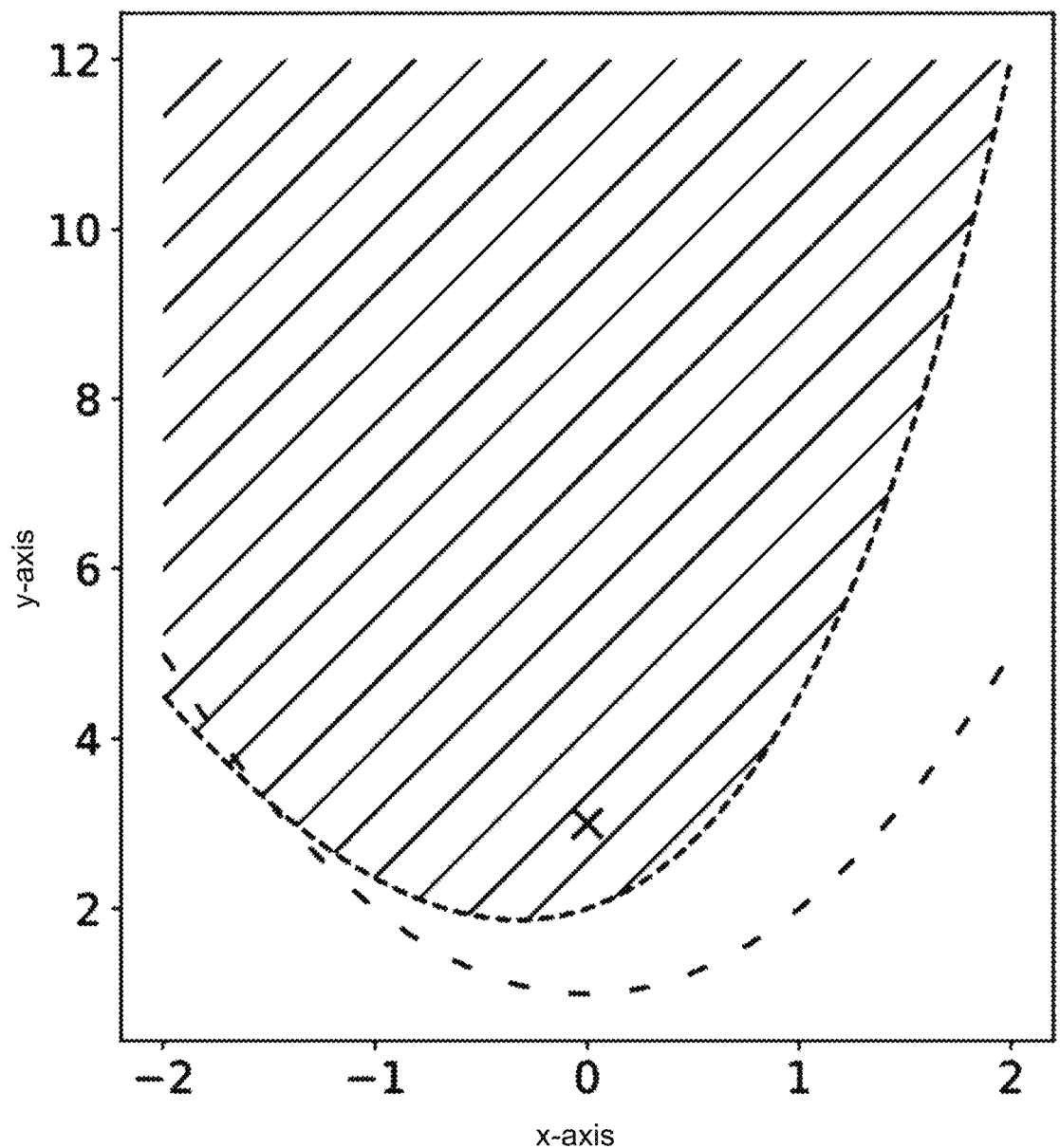
FIG. 8 shows, for one example embodiment, a section from the Pearson plane which contains a solution set for the condition that the respective statistical distribution should be able to model the frequency or probability of the measurement data values up to the left edge of the value interval.
Figure 9:
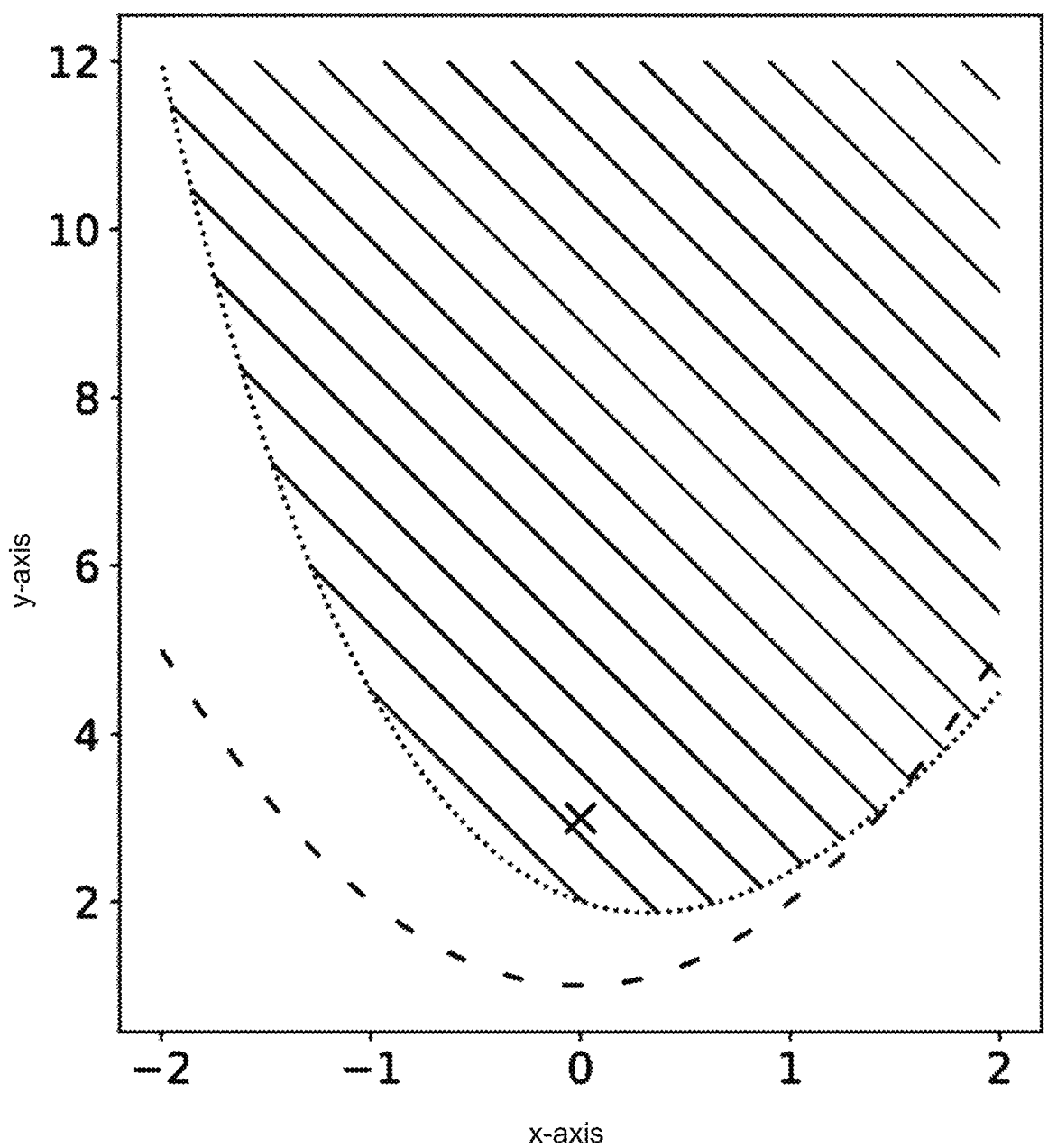
FIG. 9 shows, for the example embodiment of FIG. 8, a section from the Pearson plane which contains a solution set for the condition that the respective statistical distribution should be able to model the frequency or probability of the measurement data values up to the right edge of the value interval.

What emerges from Equation (1) is that a distribution is sought after, the lower support limit $v_{min}$ of which is less than or equal to the minimum of the range $r_{min}$. Any distribution can be visualized as skewness/kurtosis point in the Pearson plane. Thus, the set of all distributions that satisfy Equation (1) can be represented by a set in the Pearson plane. This yields a solution set which is illustrated by hatching in FIG. 8 for one example embodiment. It is worth noting that the solution set is bounded below by a convex boundary line, i.e., located above the boundary line. Equally, a solution set can be obtained proceeding from Equation (2), said solution set being illustrated by hatching for the example embodiment in FIG. 9. To aid orientation, the dashed line forming the boundary to the forbidden region is illustrated in FIG. 8 and FIG. 9, like in FIG. 4. The overall solution set for the example embodiment is illustrated with crosshatching in FIG. 10. These FIGS. should be understood to be schematic in respect of the fact that the partial solution sets in FIG. 8 and FIG. 9 extend into the forbidden region. In reality, the partial solution sets do not extend into the forbidden region.

Figure 10:
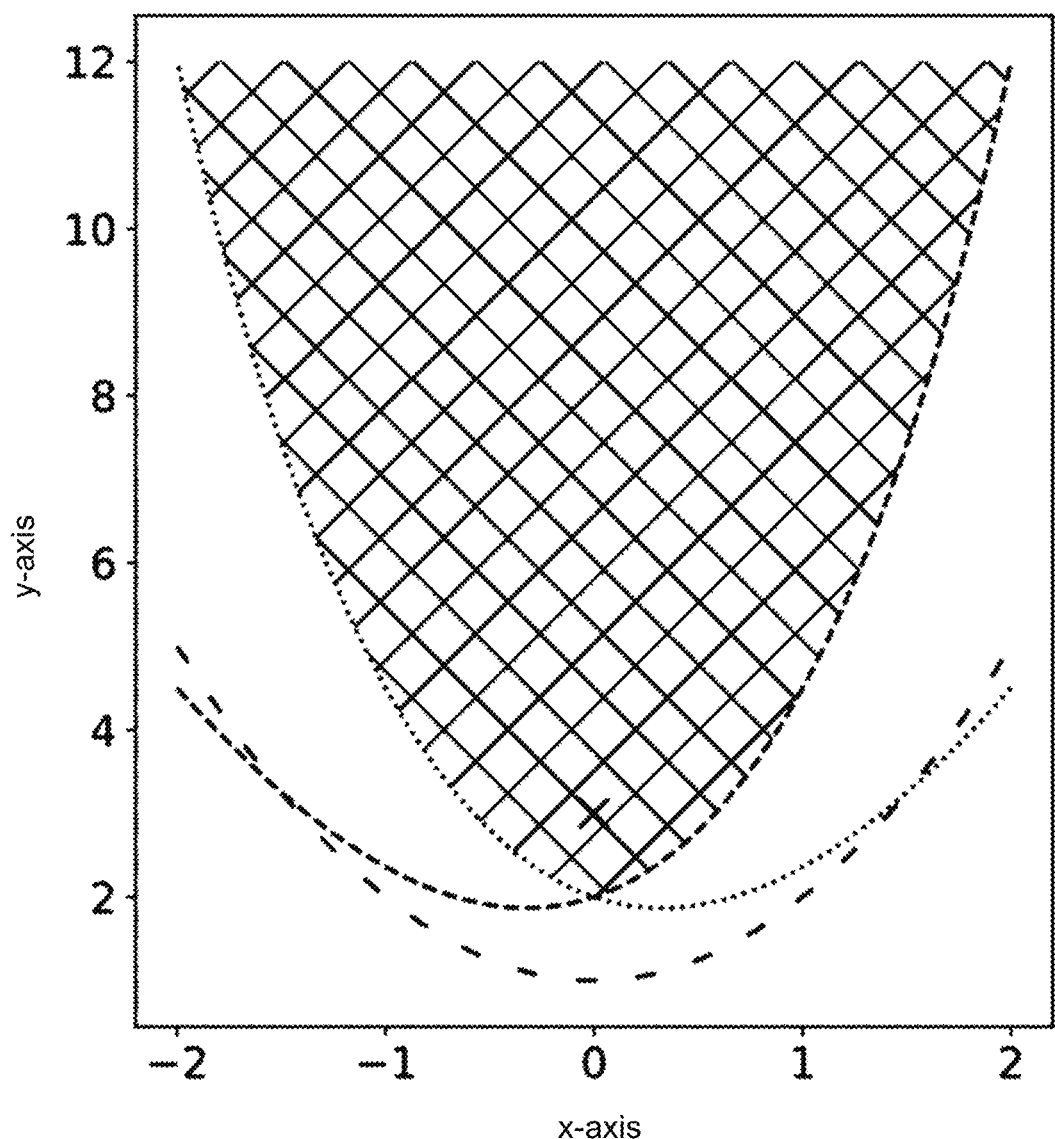
FIG. 10 shows, for the example embodiment of FIG. 8 and FIG. 9, a section from the Pearson plane which contains the intersection of the solution sets of FIG. 8 and FIG. 9.

The point of intersection of the boundary curves of the partial solution sets, illustrated in FIG. 10 by a dotted and a dashed line, has the value pair of the skewness and the kurtosis which corresponds to that statistical distribution within the system of distributions for which the support equals the range. In the example embodiment, this point of intersection lies at the skewness value of zero but can also adopt negative or positive skewness values in other cases.

$M_L$ denotes the solution set proceeding from Equation (1) and $M_R$ denotes the solution set proceeding from Equation (2), which can be defined as follows:

$M_L = \{(s,k): v_{min}(s,k) \leq r_{min}\}$ and $M_R = \{(s,k): r_{max} \leq v_{max}(s,k)\}$.

Here, (s, k) denotes a value pair of the skewness s and the kurtosis k.

An example embodiment for determining the sets $M_L$ and $M_R$ is now described below.

The Pearson distribution system is based on the following conventional differential equation for a probability density function. A normalized solution $f(x)$ of the conventional differential equation $$f'(x) = \frac{a(x)}{b(x)} f(x) \quad (3)$$

with the polynomials $$a(x) = x + a_0, \quad a_0 \in R \quad (4)$$

$$b(x) = b_2 + b_1 x + b_0, \quad b_0, b_1, b_2 \in R, \quad (5)$$

where R denotes the set of real numbers is referred to below as Pearson probability density function.

The coefficients of the polynomials a(x) and b(x), as defined in Equations (4) and (5), parameterize the still unknown probability density function $f(x)$. The form and the definition range of the probability density function, in particular, depend strongly on the number and the location of the zeros of the denominator polynomial b(x).

In order to relate the probability density function to variables with statistical significance, a relationship is established between, firstly, the coefficients $a=(a_0,1)^T$ and $b=(b_0, b_1, b_2)^T$ and, secondly, a specific set of moments of the probability density function. The standardized moments $\tilde{\mu}_n$, see above, are invariant in respect of scaling and displacement transformations of the random variable X, for which they are or have been calculated. Therefore, the standardized moments $\tilde{\mu}_n$ of the random variable X can be considered to be independent of their raw and central moments $v_1(X)$ and $\mu_2(X)$ (see above). Proceeding therefrom, it is possible to define a parameterized tuple M of moments for a Pearson probability density function and its assigned random variables X. The tuple M has already been defined above. In the process, the aforementioned labels $v_1(X)$, $\mu_2(X)$, $\tilde{\mu}_3$, and $\tilde{\mu}_4$ were introduced for the expected value, the variance, the skewness, and the kurtosis. Reference is made to a partial set of the elements of the tuple M by virtue of using the corresponding indices, e.g., $M_{1:2}(X) = (v_1(X), \mu_2(X))$.

Below, the raw moments $\{v_i(X)\}_{i=1}^4$ and the tuple M are related to the parameters a and b of the conventional differential equations. The coupling between the moments and the coefficients can be written in the form of a matrix equation as:

$$\begin{bmatrix} 0 & 1 & 2v_1 & 1 \\ 1 & 2v_1 & 3v_2 & v_1 \\ 2v_1 & 3v_2 & 4v_3 & v_2 \\ 3v_2 & 4v_3 & 5v_4 & v_3 \end{bmatrix} \begin{bmatrix} b_0 \\ b_1 \\ b_2 \\ a_0 \end{bmatrix} = - \begin{bmatrix} v_1 \\ v_2 \\ v_3 \\ v_4 \end{bmatrix}. \quad (6)$$

Below, the aforementioned standardization is undertaken in order to simplify the solution. However, a corresponding solution can also be derived without such a standardization. Then, the solution equations become correspondingly more complex. For $v_1=0$ and $v_2=1$, the solution of Equation (6) is as follows:

$$b = \frac{1}{c} \begin{bmatrix} 4\zeta_2 - 3\zeta_1^2 \\ (3+\zeta_2)\zeta_1 \\ 2\zeta_2 - 3\zeta_1^2 - 6 \end{bmatrix}, a = \begin{bmatrix} -b_1 \\ 1 \end{bmatrix}, \quad (7)$$

where $\tilde{\mu}_3(X) = \zeta_1(X)$ and $\tilde{\mu}_4(X) = \zeta_2(X)$ are used as labels for the moments of the skewness and the kurtosis and where $c = 2(9 + 6\zeta_1^2 - 5\zeta_2)$. Taking account of Equation (4) and Equation (6), the Pearson probability density function can now be parameterized as follows.

Given a parameterization moment tuple M* with a scaling and displacement component $M^*_{1:2}(X) = \{v^*_1, \mu^*_2\}$ and a form component $M^*_{3:4}(X) = \{\zeta^*_1, \zeta^*_2,\}$ the corresponding Pearson probability density function can be constructed in two steps. In a first step, the coefficients a* and b* are calculated using Equation (7) and the problem of the Pearson differential equation is solved with these parameters in order to obtain a standardized Pearson probability density function $f_s(x)$ and the corresponding random variable X. In a second step, a transformation $\tau(x)=(x-v^*_1)/\sqrt{\mu_2}$ is set up and the required Pearson random variable X is defined as $X=\tau^{-1}(X_s)$ and its probability density function is defined as $f(x)=\tau'(x)f_s(\tau(x))$.

Here, the superscript index −1 denotes the inverse function and the superscript comma denotes the first derivative of the function. Now, $M(X)=M^*$. This shows that each of the tuples $M^*_{1:2}(X)$ and $M^*_{3:4}(X)$, i.e., the scaling and displacement component on the one hand and the form component on the other hand, can be handled independently of one another within the scope of the procedure of fitting the Pearson probability density function to the corresponding moments of the distribution.

The Pearson plane is defined as a plane E of real numbers, where the first coordinate is the skewness and the second coordinate is the kurtosis. The Pearson plane E is now subdivided into three regions which are characterized by their behavior in respect of the zeros. The distinguishing criterion $\kappa(\zeta)$ for the three regions and corresponding boundary curves is defined as:

$$\kappa(\zeta) := \frac{\zeta_1^2(\zeta_2+3)^2}{4(2\zeta_2-3\zeta_1^2-6)(4\zeta_2-3\zeta_1^2)}.$$

The main regions of the Pearson plane E can be specified as set forth below. If $x_1$ and $x_2$ are the zeros of the polynomial $b(x;\zeta)$, the coefficients b of which are elements of the three-dimensional space of real numbers and are calculated using Equation (7), then the regions $R_1$, $R_4$, and $R_6$ of the Pearson plane E can be specified as follows:

$\mathcal{R}_1:=\{\zeta\in\varepsilon:x_1,x_2\in\mathbb{R} \wedge x_1x_2<0\}=\{\zeta\in\varepsilon:\kappa(\zeta)<0\},$ $\mathcal{R}_4:=\{\zeta\in\varepsilon:x_1,x_2\in\mathbb{C}\}=\{\zeta\in\varepsilon:\kappa(\zeta)\in(0,1)\},$ $\mathcal{R}_6:=\{\zeta\in\varepsilon:x_1,x_2\in\mathbb{R} \wedge x_1x_2>0\}=\{\zeta\in\varepsilon:\kappa(\zeta)>0\}.$ (8)

The boundary curves $C_i$ with i=2, 3, 5, 7 of the specified regions, referred to as Pearson curves below, can be specified as follows:

$\mathcal{C}_2:=\{\zeta\in\varepsilon:\zeta_1=0 \wedge \zeta_2\in(1,3)\},$ $\mathcal{C}_3:=\{\zeta\in\varepsilon:2\zeta_2-3\zeta_1^2-6=0\}=\{\zeta\in\varepsilon:\kappa(\zeta)\in\{-\infty,\infty\}\},$ $\mathcal{C}_5:=\{\zeta\in\varepsilon:\kappa(\zeta)=1\},$ $\mathcal{C}_7:=\{\zeta\in\varepsilon:\zeta_1=0 \wedge \zeta_2>3\}.$ (9)

Further, the aforementioned forbidden region $\mathcal{R}_\otimes:=\{\zeta\in\varepsilon:\zeta_2<\zeta_1^2+1\}$ (10)

of the Pearson plane is introduced, the boundary line of which $\mathcal{C}_\otimes:=\{\zeta\in\varepsilon:\zeta_2=\zeta_1^2+1\}$ (11)

is given. Firstly, the forbidden region contains pairs of points $(\zeta_1,\zeta_2)$, which can never occur as a solution to the calculation of the skewness and the kurtosis. Secondly, the solutions of the conventional Pearson differential equations for points on the forbidden curve are not integrable and do not represent a probability density function for this reason.

Therefore, the regions with all points in the Pearson plane for which a solution can be found can be defined as follows:

$\mathcal{R} := \varepsilon \setminus (\mathcal{C}_\otimes \cup \mathcal{R}_\otimes).$ (12)

Figure 11:
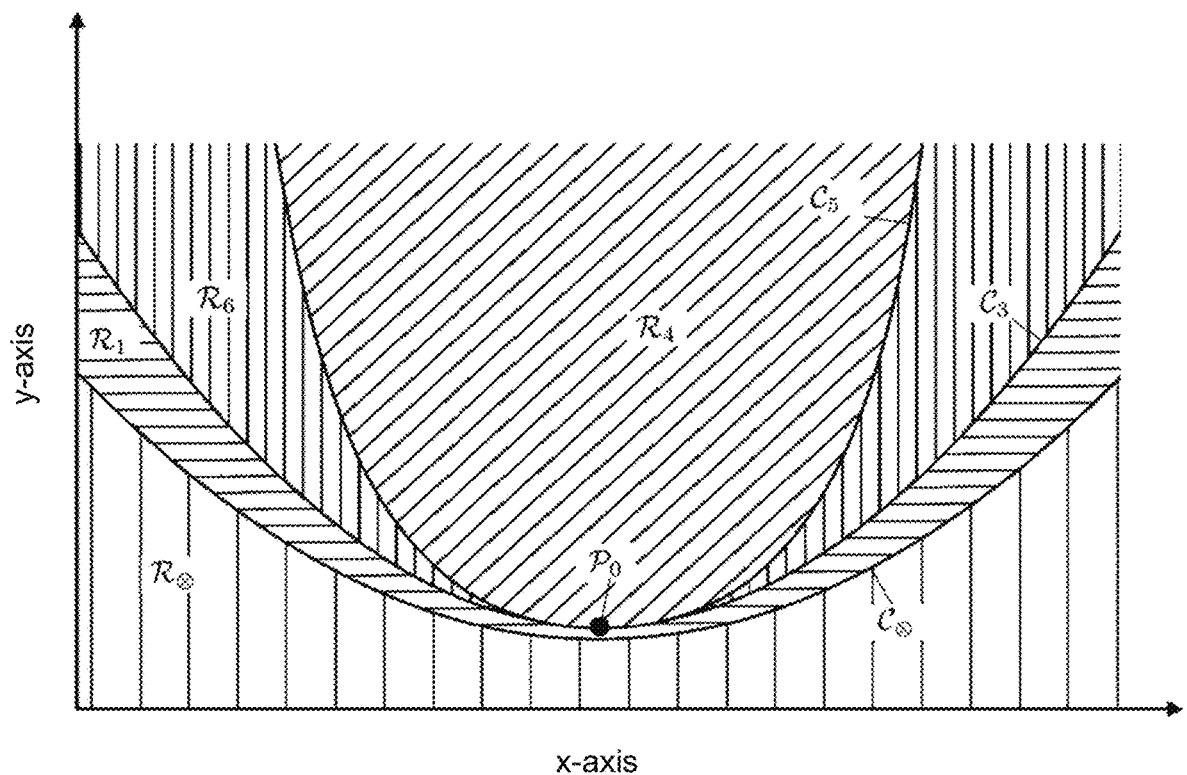
FIG. 11 shows a section from the Pearson plane which indicates different regions and their boundary lines, wherein the skewness varies along the horizontal axis and the kurtosis varies along the vertical axis.

Expressed differently, the totality of these regions can be specified as the set of points which corresponds to the entire plane minus the set of the points in the forbidden region and minus the set of the points on the boundary line of the forbidden region. For one example embodiment, FIG. 11 shows the aforementioned three regions $R_1$, $R_4$, $R_6$ and two of their aforementioned boundary curves $C_3$ and $C_5$. Moreover, like in FIG. 4, the forbidden region and its boundary line are illustrated in the lower part of FIG. 11. The point Po illustrated in FIG. 11 represents the relative position of the value pair of the skewness and the kurtosis of the normal distribution.

Only standardized Pearson distributions are considered below. Why such a consideration suffices was already justified above. Now, an expression for the support interval of Pearson distributions is initially derived as a function of the skewness $\zeta_1$ and the kurtosis $\zeta_2$. Then, curves or boundary lines are derived for the aforementioned solution sets. Finally, sets of the solution sets are derived for the right and the left support boundary are derived.

The zeros $x_1$ and $x_2$ of the polynomial $b(x)$ defined in Equation (5) can be specified as follows:

$$x_1 = \frac{-b_1 - \sqrt{b_1^2 - 4b_0b_2}}{2b_2} \quad (13)$$

and $$x_2 = \frac{-b_1 - \sqrt{b_1^2 - 4b_0b_2}}{2b_2}. \quad (14)$$

If the coefficients $b_i$ are specified as functions of the skewness and the kurtosis, the following equations arise for the zeros $x_i=x_i(\zeta)$:

$$x_{(1)}(\zeta) = \frac{u(\zeta) + \text{sgn}(c)\sqrt{v(\zeta)}}{w(\zeta)} \quad (15)$$

and $$x_{(2)}(\zeta) = \frac{u(\zeta) - \text{sgn}(c)\sqrt{v(\zeta)}}{w(\zeta)}. \quad (16)$$

Setting $c=2(9+6\zeta_1^2-5\zeta_2)$, it is possible to specify the following auxiliary functions:

$u(\zeta):=\zeta_1(\zeta_2+3),$ $v(\zeta):=-36\zeta_1^4+\zeta_1^2(\zeta_2^2+78\zeta_2-63)-32(\zeta_2-3)\zeta_2,$ $w(\zeta):=6\zeta_1^2-4\zeta_2+12.$ (17)

The zeros $x_1$ and $x_2$ are complementary in respect of sgn(c), i.e., in respect of the sign. This leads to the following alternative equations:

$$x_{(1)}(\zeta) := \frac{u(\zeta) - \sqrt{v(\zeta)}}{(w)(\zeta)} \quad (18)$$

and $$x_{(2)}(\zeta) := \frac{u(\zeta) + \sqrt{v(\zeta)}}{w(\zeta)}. \quad (19)$$

In respect of Equations (18) and (19), it is noted that the argument of the square root in the numerator of the fraction is only not defined for negative expressions. Therefore, the functions as per Equations (18) and (19) are not defined for the forbidden region and its boundary line.

In relation to a standardized Pearson distribution with a moment tuple $M^*_{3,4}=\zeta$, where the left boundary of the support interval is denoted by $\xi_L$ and the right boundary of the support interval is denoted by R, the support interval $I=(\xi_L, \xi_R)$ is defined as follows:

$$\xi_L = x_L(\zeta) := \begin{cases} x_{(1)}(\zeta), & \zeta \in \mathcal{R}_1 \cup C_2 \vee (\zeta_1 > 0 \wedge \zeta \in \mathcal{R}_6 \cup C_5), \\ -\dfrac{2}{\zeta_1}, & \zeta_1 > 0 \wedge \zeta \in C_3, \\ -\infty, & \text{else} \end{cases} \quad (20)$$

$$\xi_R = x_R(\zeta) := \begin{cases} x_{(2)}(\zeta), & \zeta \in \mathcal{R}_1 \cup C_2 \vee (\zeta_1 < 0 \wedge \zeta \in \mathcal{R}_6 \cup C_5), \\ -\dfrac{2}{\zeta_1}, & \zeta_1 < 0 \wedge \zeta \in C_3, \\ \infty, & \text{else} \end{cases}$$

Here, "else" has its conventional meaning. Proceeding from Equations (20) and (21), the following implicit equations can be specified for boundary curves $c_L(t)$ and $c_R(t)$ of the solution regions:

$$x_L(c_L(t)) = \xi_L \text{ for } \xi_L < 0,$$

$$x_R(c_R(t)) = \xi_R \text{ for } \xi_R > 0, \quad (22)$$

where "for" has its conventional meaning. A few preliminary reflections are made below before these curves are calculated. The naïve solution of the equations $x_{(1)}(\zeta) = \xi_L$ and $x_{(2)}(\zeta) = \xi_R$ for the zeros leads to the curves$(t; \xi)$, which is defined by:

$$s(t; \xi) := \begin{bmatrix} t \\ \dfrac{6\xi^2 - 3\xi t + 3t^2 + 3\xi^2 t^2}{4 + 2\xi^2 + \xi t} \end{bmatrix} \quad (23)$$

for $x_{(1)}(s(t;\xi_L)) = \xi_L$ and $x_{(2)}(s(t;\xi_R)) = \xi_R$. The curve $s(t; \xi)$ has the following properties: For $\xi \neq 0$, there is a singularity at $$\zeta_1^\infty(\xi) := -(4+2\xi^2)/\xi;$$

For $\xi \neq 0$, there is a point of intersection at the following point of the forbidden curve, specifically the boundary line of the forbidden region:

$$\zeta_1^\otimes(\xi) := (\xi^2 - 1)/\xi$$

For $|\xi| > \sqrt{2}$, there is a point of intersection with the aforementioned curve or boundary line $C_5$, see Equation (9):

$$\zeta_1^5(\xi) := -4\xi/(\xi^2 - 1)$$

For $\xi \neq 0$, there is a unique global minimum at:

$$\zeta_1^{\min} := \zeta_1^\infty - 2\sqrt{\xi^2 + 4/\xi^2 + 5} = \dfrac{2}{\xi + 2/\xi - \sqrt{\xi^2 + 4/\xi + 5}}$$

The equations $x_{(1)}(\zeta) = \xi_L$ and $x_{(2)}(\zeta) = \xi_R$ are solved by the branch of the curve $s(t;\xi)$ which, for $x_{(1)}(\zeta)$, is located to the right and, for $x_{(2)}(\zeta)$, to the left of $\zeta_1^\infty(\xi)$.

Although $s(t;\xi)$ is not the solution to Equations (22), the following deliberation shows that only the range of definition of the curve $s(t;\xi)$ needs to be adapted in order to obtain the solution. Implicit Equations (22) for the support boundary lines $c_L(t;\xi_L)$ and $c_R(t;\xi_R)$ have the following solutions:

$$c_L(t; \xi_L) := s(t; \xi_L) \text{ with}$$

$$\mathcal{D}(c_L) := \begin{cases} (\zeta_1^\otimes(\xi_L), \zeta_1^5(\xi_L)), & \text{if } \xi_L \in (-\infty, -\sqrt{2}), \\ (\zeta_1^\otimes(\xi_L), \zeta_1^\infty(\xi_L)), & \text{if } \xi_L \in [-\sqrt{2}, 0) \end{cases}$$

and $$c_R(t; \xi_R) := s(t; \xi_R) \text{ with}$$

$$\mathcal{D}(c_R) := \begin{cases} (\zeta_1^5(\xi_R), \zeta_1^\otimes(\xi_R)), & \text{if } \xi_R \in (\sqrt{2}, \infty). \\ (\zeta_1^\infty(\xi_R), \zeta_1^\otimes(\xi_R)), & \text{if } \xi_R \in (0, \sqrt{2}]. \end{cases}$$

Here, "with" and "if" have their conventional meanings. What follows therefrom is that there is a transformation between the right and the left support boundary line. The following relationship applies:

$$c_R(t;\xi_R) = c_L(-t; -\xi_R)$$

In relation to Equations (22), the following follows:

$$x_L(c_L(t;\xi_L)) = \xi_L < 0 \text{ and } x_R(c_R(t;\xi_R)) = \xi_R > 0$$

For the region of the Pearson plane outside of the forbidden region, it is now possible to define the sets $R_L(\xi)$ for $\xi < 0$ in respect of the left or lower support boundary $v_{min}$ and $R_R(\xi)$ for $>0$ in respect of the right or upper support boundary $v_{max}$, which are equivalent to the aforementioned solution sets $M_L$ of Equation (1) and $M_R$ of Equation (2), as follows:

$$\mathcal{R}_L(\xi) = \{\zeta \in \mathcal{R} : x_L(\zeta) \leq \xi\}, \xi < 0,$$

$$\mathcal{R}_R(\xi) = \{\zeta \in \mathcal{R} : x_R(\zeta) \geq \xi\}, \xi > 0,$$

What follows therefrom is that the relationship $a \leq \xi$ (applies to a Pearson probability density function with a support region (a, b) if $\xi < 0$ and if the point of the Pearson plane with the coordinates $\zeta$ is located in the solution set or the support region $R_L(\xi)$ for the left support boundary. Analogously, $b \geq \xi$ applies if $\xi > 0$ and if the point of the Pearson plane with the coordinates $\zeta$ is located in the solution set or the support region $R_R(\xi)$ for the right support boundary.

The left support region $R_L(\xi)$ for $\xi < 0$ can be expressed by the set $S(\xi)$ of points in the Pearson plane, which unifies the following individual sets $S_i(\xi)$, where $i = 1, 2, 3$:

$$\mathcal{S}_1(\xi) := \{\zeta \in \mathcal{R} : \zeta_1 \leq \mathcal{D}_\xi\},$$

$$\mathcal{S}_2(\xi) := \{\zeta \in \mathcal{R} : \zeta_1 \in \mathcal{D}_\xi \wedge \zeta_2 \geq c_L(\cdot;\xi)\},$$

$$\mathcal{S}_3(\xi) := \{\zeta \in \mathcal{R} : \zeta_1 \geq \mathcal{D}_\xi \wedge v(\xi) < 0\},$$

Figure 12:
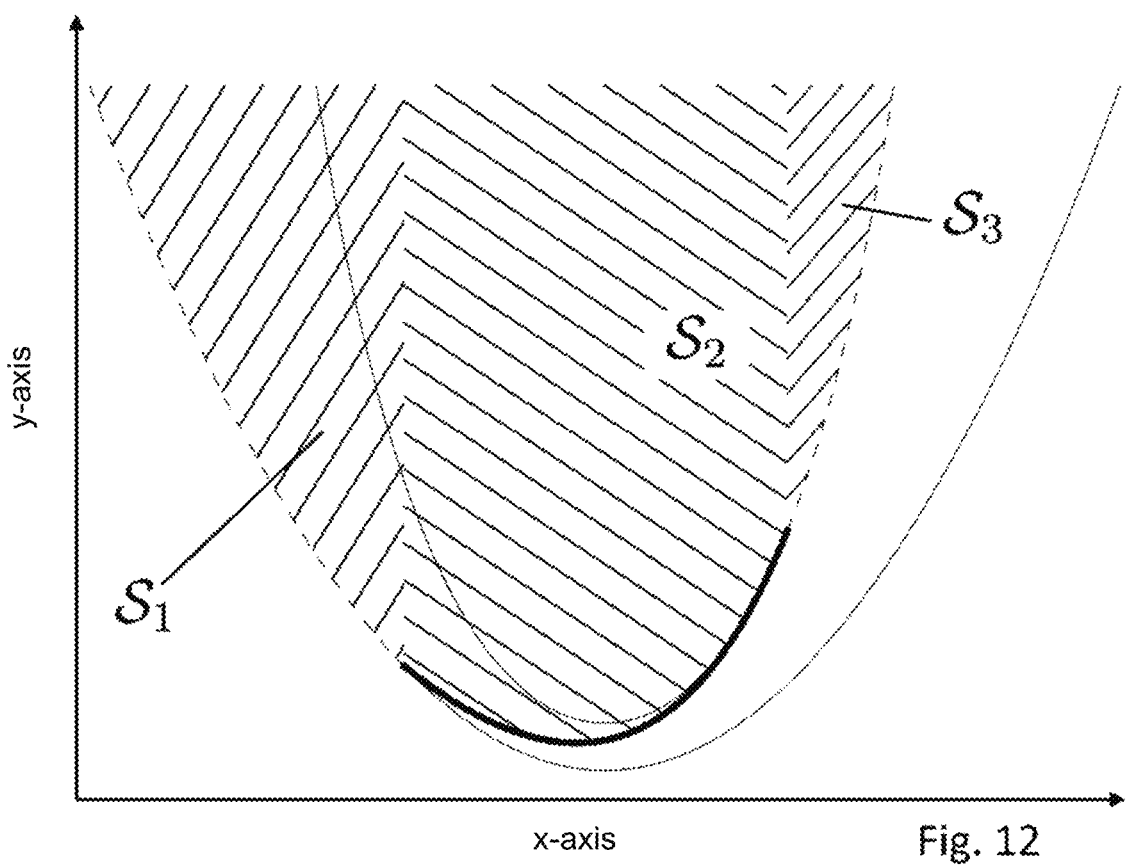
FIG. 12 shows a section from the Pearson plane with portions of a solution set for the left support region, i.e., the support region in respect of the left boundary of the value interval, for a first parameter value.
Figure 13:
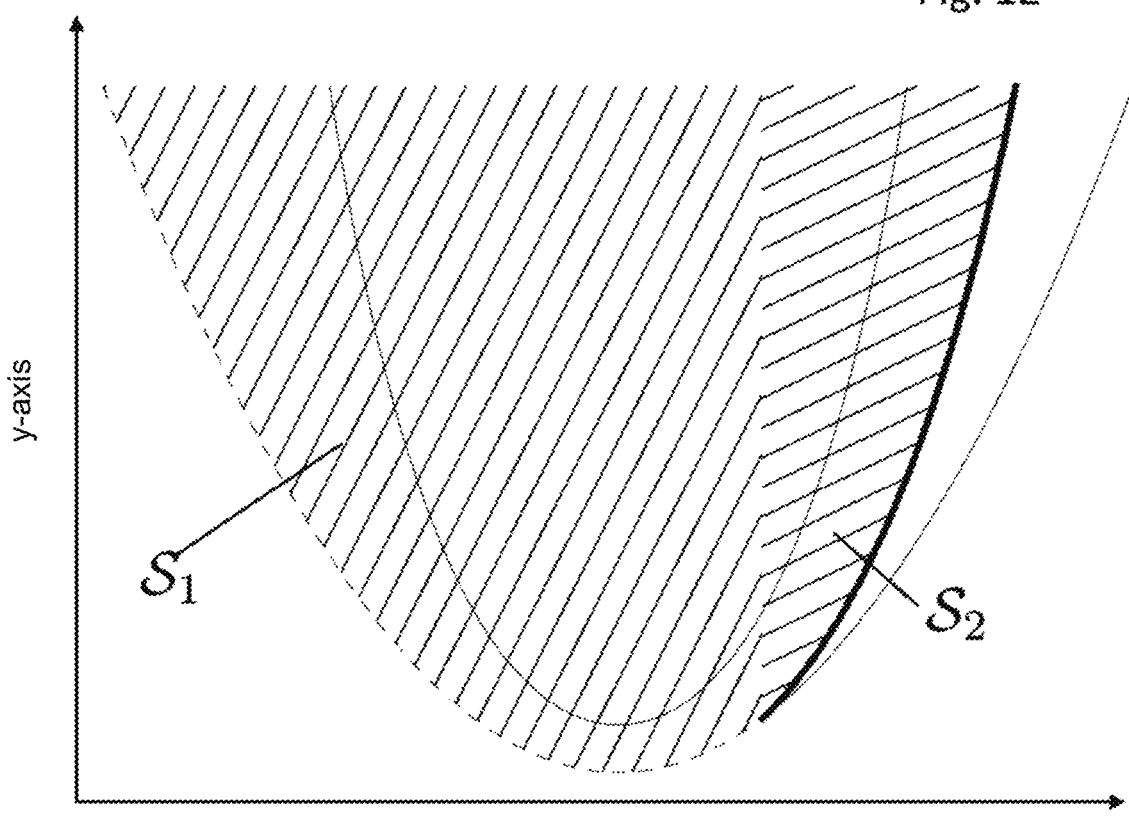
FIG. 13 shows a section from the Pearson plane with portions of a solution set for the left support region for a second parameter value.

Here, $D_\xi$ denotes the range of definition of the left support boundary curve $c_L$, $v(\xi)$ denotes the middle one of Equations (17) and R denotes the region in the Pearson plane without the forbidden region and its boundary line. FIG. 12 shows the solution set $R_L(\xi)$ in respect of the left or lower support boundary $v_{min}$ for $\xi = -2.5$. FIG. 13 shows this solution set $R_L(\xi)$ for $\xi = -0.5$. While FIG. 12 shows all three sets $S_i$, the set $S_3$ is empty in the case of FIG. 13. This applies to the range $-\sqrt{2} \leq \xi < 0$, since there is no point of intersection for the left boundary curve $c_L$ and the aforementioned curve $C_5$. In FIG. 12 and FIG. 13, the boundary curve of the set $S_2$ is highlighted in each case by virtue of the boundary curve being represented by a wide solid line. The dashed line, as boundary curve of the set $S_1$, is the boundary line of the forbidden region.

Proceeding from the relationship between the left support region $R_L(\xi)$ and $\xi$, it is possible to state the following: The following applies to two negative values $b \leq a < 0$:

$$\mathcal{R}_L(b) \subseteq \mathcal{R}_L(a),$$

$$\zeta \in \mathcal{R}_L(a) \setminus \mathcal{R}_L(b) \Rightarrow (x_L(\zeta), 0) \subset (b, 0).$$

If values $\xi_L < 0 < \xi_R$ are given, i.e., solution sets are defined for the right and left support boundary, the following applies to the intersection:

$$\mathcal{R}_{L \cap R}(\xi_L, \xi_R) := \mathcal{R}_L(\xi_L) \mathcal{R}_R(\xi_R)$$

$$= \{\zeta \in \mathcal{R} : (\xi_L, \xi_R) \subseteq \mathrm{supp}(f(\cdot\,; \zeta))\}.$$

The description above contains an example embodiment for defining the set of all those statistical distributions that are able to describe a frequency of measurement data values in the entire value interval (the range). There now is a description of an example embodiment of the invention in relation to the check whether the defined set contains a statistical distribution which has the moment values of the skewness and the kurtosis that were ascertained for a sample.

Figure 14:
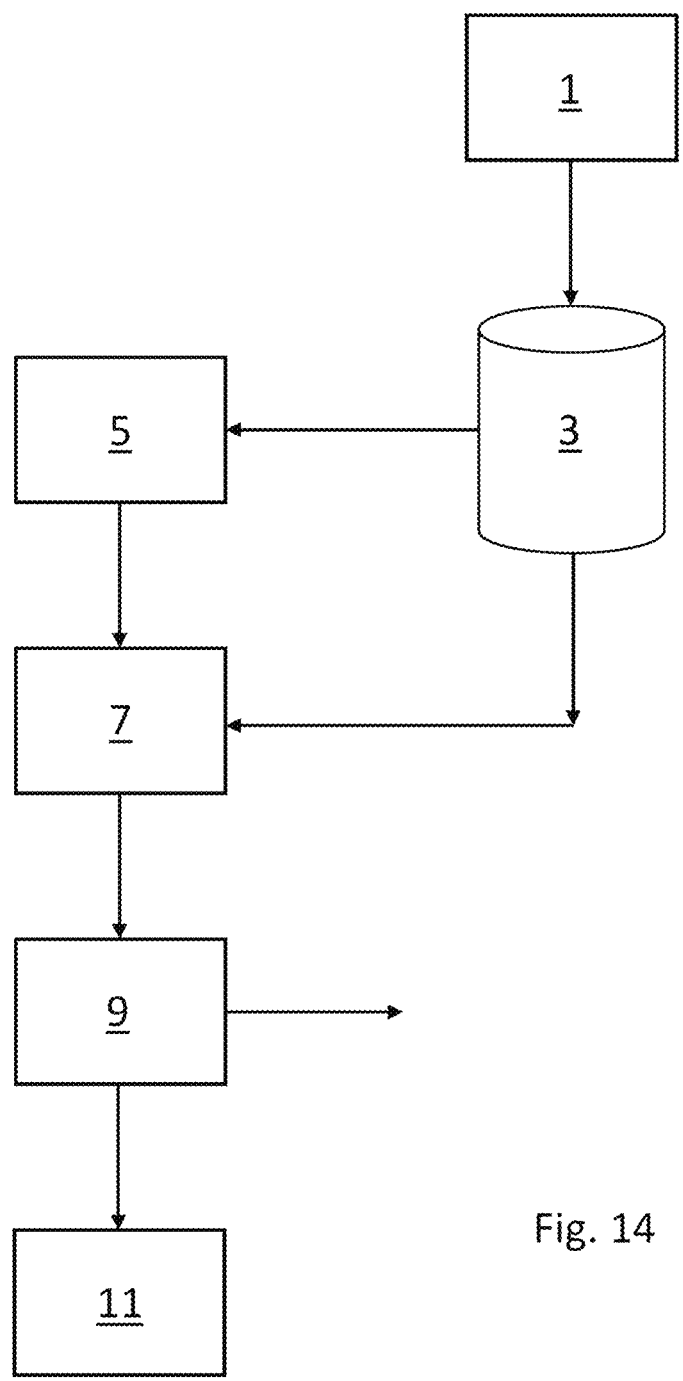
FIG. 14 schematically shows an arrangement of devices for evaluating a sample of measurement data from measuring a multiplicity of workpieces, which can also be interpreted as a flowchart.

FIG. 14 schematically shows an arrangement of devices for evaluating a sample of measurement data from measuring a multiplicity of workpieces. The illustration in FIG. 14 can also be considered to be a flowchart for explaining an embodiment of a method for evaluating the sample of measurement data.

By way of example, a coordinate measuring machine 1 measures the plurality of workpieces and transfers the measurement data, optionally following preprocessing of the measurement data, to a measurement data memory 3. A definition device 5 is configured to define a set of all those statistical distributions that are able to describe a frequency of measurement data values in the entire value interval from the system of statistical distributions for a value interval of the measurement data, which is a specified value interval or a value interval of the measurement data actually arising in the sample. In FIG. 14, an input of the definition device 5 is connected to an output of the measurement data memory 3. Therefore, the definition device 5 can ascertain the value interval, in particular from the measurement data available. As an alternative or in addition thereto, it can obtain additional information about a value interval going beyond the value interval of the measurement data, said additional information being stored in the measurement data memory 3. However, in practice the information about the specified value interval can also be made available to the definition device 5 in any other way, and so a link between the measurement data memory 3 and the definition device 5 is not mandatory.

An output of the definition device 5 is connected to an input of a moment ascertainment device 7 which is configured to ascertain a respective moment value of the skewness and the kurtosis from the sample of measurement data corresponding to a first statistical distribution. During the operation or while the method is carried out, the moment ascertainment device 7 ascertains values of the skewness and the kurtosis for the sample and transmits the values to a checking device 9 which is configured to use the ascertained moment values to check whether the defined set contains a statistical distribution which has the ascertained moment values of the skewness and the kurtosis, and to produce a corresponding test result.

From the test result, it is clear whether or not such a statistical distribution exists in the defined set. Should this be the case, a signal output by the checking device 9, for example, can confirm that the first statistical distribution is suitable for the purpose of statistical modeling of the sample over the entire specified value interval. Should this not be the case, the checking device 9 outputs the test result or a signal to a distribution ascertainment device 11 which ascertains a second statistical distribution that is suitable for the purpose of statistical modeling of the sample over the entire specified value interval. In this case, the distribution ascertainment device 11 can ascertain, e.g., that value pair from the Pearson plane which corresponds to a suitable statistical distribution. Using the information about the value pair, it is possible, in turn, to produce the suitable statistical distribution as second statistical distribution.

The definition device 5 and the distribution ascertainment device 11 can also form an arrangement without the other devices illustrated in FIG. 14. Further, the definition device 5 and the distribution ascertainment device 11 can serve to prepare the evaluation of a sample of measurement data. In both cases, the definition device 5 is configured to define a set of all those statistical distributions that are able to describe a frequency of measurement data values in the entire value interval from the system of statistical distributions for a value interval of measurement data, which is a specified value interval or a value interval of a sample, to be evaluated, of measurement data. Then, the distribution ascertainment device 11 is configured to ascertain a statistical distribution from the defined set.

If FIG. 14 is interpreted as a flowchart then measurement data are produced in a method step 1, said measurement data being stored in a method step 3. In a method step 5, the set of all those statistical distributions that are able to describe a frequency of measurement data values in the entire value interval is defined. In a method step 7, a respective moment value of the skewness and the kurtosis is ascertained from the sample of measurement data corresponding to a first statistical distribution. In a method step 9, the ascertained moment values are used to check whether the defined set contains a statistical distribution which has the ascertained moment values of the skewness and the kurtosis, and a corresponding test result is produced. The sequence of the method steps arises from the arrows in FIG. 14.

Devices or method steps that are optional or belong to specific configurations are denoted by reference signs 1, 3 and 11 in FIG. 14. Method step 5 need not necessarily be always carried out when a first statistical distribution should be checked in respect of its suitability for statistical modeling of a sample over the entire specified value interval.

Figure 15:
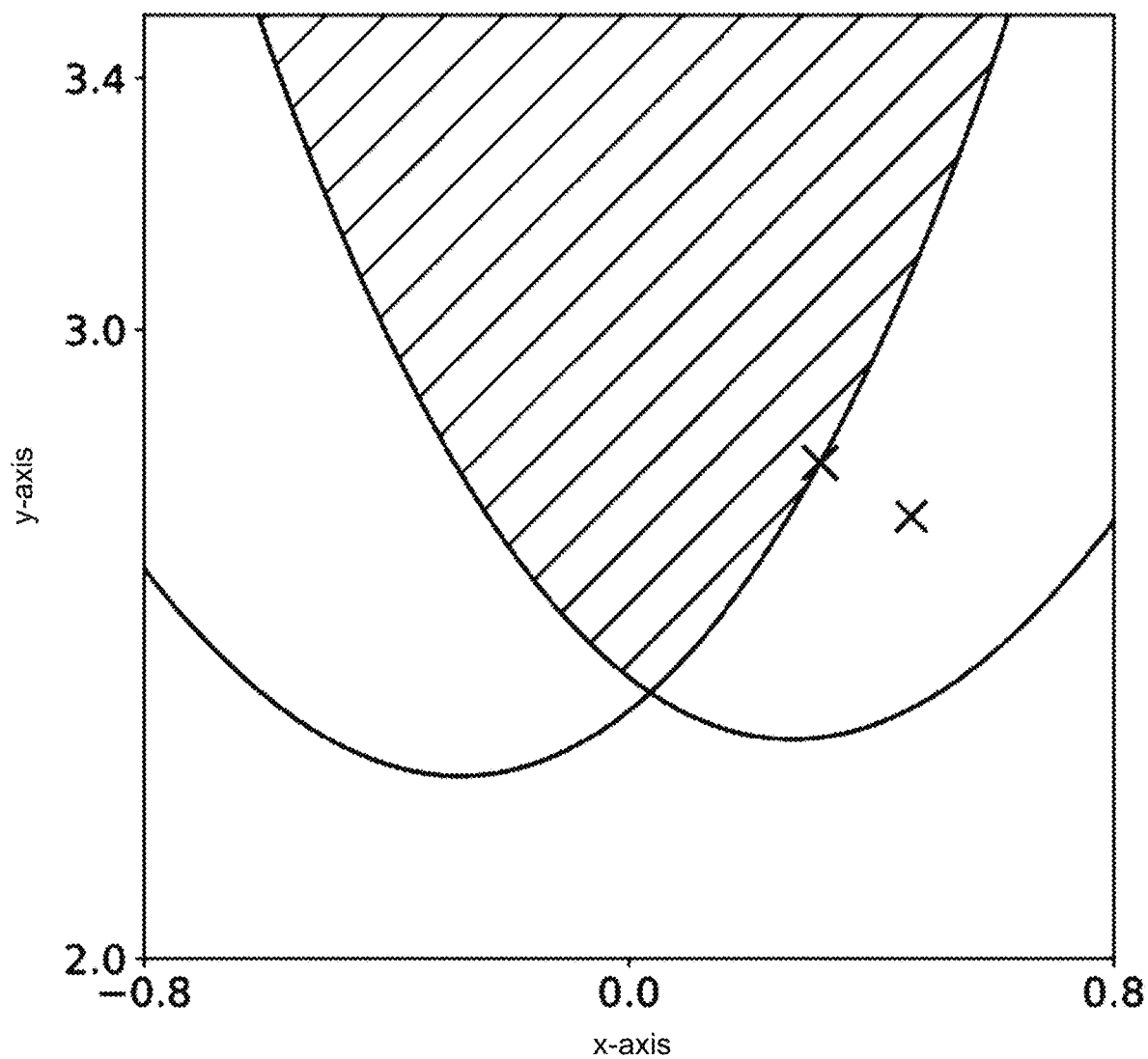
FIG. 15 shows a portion of the section from the Pearson plane of FIG. 10, wherein the hatched region in FIG. 15 corresponds to the cross-hatched region in FIG. 10 and wherein crosses are used to mark two points in the plane, said points corresponding to a first statistical distribution outside of the solution set and a second statistical distribution at the edge of the solution set.

In particular, on the basis of a measure of distance for the distance between two distributions in the Pearson plane, the distribution ascertainment device 11 can ascertain that distribution whose distance from the first statistical distribution is minimal as second statistical distribution. FIG. 15 illustrates an example of two distributions in the Pearson plane which have a minimal distance, in this case the minimal Euclidean distance in the Pearson plane. The cross situated more to the bottom right represents the first statistical distribution in a case where it is not suitable for statistically modeling the sample over the entire specified value interval. This lack of suitability is evident from the fact that the cross is located outside of the hatched area of the solution set of suitable statistical distributions. The cross represents the distribution by virtue of marking a point in the Pearson plane which corresponds to the distribution, said point in turn corresponding to the value pair of the skewness and the kurtosis of the distribution. In accordance with the rules specified here, the suitable second statistical distribution is ascertained from the first statistical distribution by virtue of ascertaining the point in the solution set of suitable distributions in the Pearson plane which has the shortest distance from the point of the first statistical distribution. In all cases, this point of shortest distance is located on the edge of the solution set.

Figure 16:
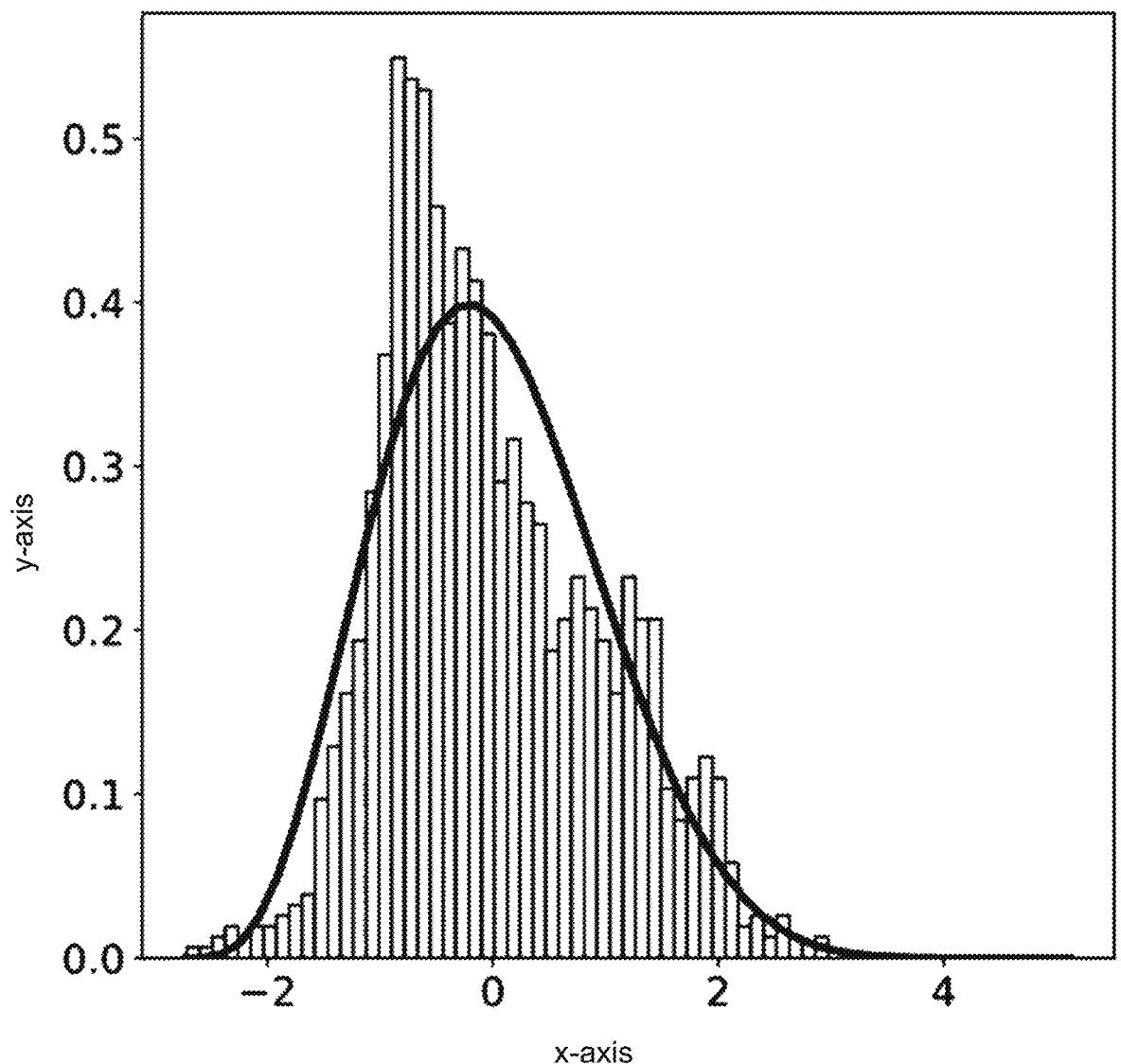
FIG. 16 shows, for the example sample and the frequency distribution of the measurement values from FIG. 1, a statistical distribution suitable for describing the frequency distribution over the entire value interval of the sample.

In a manner analogous to the illustration in FIG. 1, FIG. 16 now shows a statistical distribution, more precisely a probability density function, which was ascertained as described above and which is consequently located in the solution set of the suitable statistical distributions and is therefore suitable for statistically modeling the measurement data values of the sample over the entire specified value interval. In FIG. 16, this is evident from the fact that, in contrast to FIG. 1, the probability density function represented by the solid line also adopts positive frequency values or probability values in the region of the measurement data values smaller than −1.9.

In the case where the evaluation of a sample of measurement data is prepared, it is possible, for example, to only carry out the method steps of defining the set of all those statistical distributions that are able to describe a frequency of measurement data values over the entire value interval and of ascertaining the statistical distribution belonging to the set. Naturally, this does not preclude the ascertainment of the statistical distribution being followed by an evaluation of a sample of measurement data by means of this statistical distribution.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The phrase "at least one of A, B, and C" should be construed to mean a logical (A OR B OR C), using a non-exclusive logical OR, and should not be construed to mean "at least one of A, at least one of B, and at least one of C."

The invention claimed is:

1. A computer-executed method for evaluating a plurality of workpieces, the method comprising:
generating measurement data values by measuring the plurality of workpieces using at least one of a set of sensors coupled to at least one of a set of coordinate measuring machines, wherein:
the measurement data values represent coordinate data of the plurality of workpieces,
the set of sensors includes at least one of a tactile sensor, an optical sensor, a capacitive sensor, an inductive sensor, a time-of-flight sensor, and a chromatic confocal sensor, and
the set of coordinate measuring machines includes at least one of:
a coordinate measuring machine having the at least one of the set of sensors fixedly positioned in a measurement space of the coordinate measuring machine,
a portal-type coordinate measuring machine,
a gantry-type coordinate measuring machine,
a coordinate measuring machine having an articulated arm,
a robotic coordinate measuring machine, and
a machine tool;
accessing a sample set of the measurement data values at a definition device;
defining, at the definition device, a set of statistical distributions that are continuous probability distributions and that are capable of describing a probability of the sample set of the measurement data values over an entire data range of the sample set of the measurement data values, wherein the entire data range contains all data values of the sample set of the measurement data values;
parsing, at a moment ascertainment device, the sample set of the measurement data values to determine a skewness value and a kurtosis value, wherein the skewness value and the kurtosis value are moments of an empirical statistical distribution having discrete data values;
parsing, at a checking device, the set of statistical distributions to determine whether the set of statistical distributions includes a statistical distribution that has the skewness value and the kurtosis value;
in response to determining that the set of statistical distributions includes a statistical distribution having the skewness value and the kurtosis value, producing a test result, wherein the test result indicates at least one of:
whether a process in which the plurality of workpieces have been produced is controllable, and
whether a predetermined quality criterion for the process is fulfilled or not fulfilled with regard to a frequency distribution of the sample set of the measurement data values; and
responsive to the test result, at least one of producing workpieces, processing workpieces, producing arrangements of workpieces, and processing arrangements of workpieces.

2. The method of claim 1 further comprising controlling, based on the test result, a process for at least one of producing workpieces, processing workpieces, producing arrangements of workpieces, and processing arrangements of workpieces.

3. The method of claim 1 further comprising determining, based on the test result, a quality of a process for at least one of producing workpieces, processing workpieces, producing arrangements of workpieces, and processing arrangements of workpieces.

4. The method of claim 1 further comprising:
ascertaining a first statistical distribution of the measurement data values; and
ascertaining a second statistical distribution for the measurement data values in response to the test result indicating that the set of statistical distributions does not include a statistical distribution having the skewness value and the kurtosis value,
wherein the second statistical distribution is a statistical distribution selected from the defined set.

5. The method of claim 4 further comprising controlling, based on the second statistical distribution, a process for at least one of producing workpieces, processing workpieces, producing arrangements of workpieces, and processing arrangements of workpieces.

6. The method of claim 4 further comprising determining, based on the second statistical distribution, a quality of a process for at least one of producing workpieces, processing workpieces, producing arrangements of workpieces and processing arrangements of workpieces.

7. The method of claim 4 wherein:
a measure of distance has been or is defined for two statistical distributions in each case, which are able to describe a frequency of measurement data values as a function of the measurement data values;
the measure of distance describes a distance between the two statistical distributions; and
the value of the measure of distance of the first statistical distribution or a distribution corresponding to the first statistical distribution from the second statistical distribution is a minimum of the measure of distance of the distance of the first statistical distribution or the corresponding distribution from the statistical distributions in the defined set.

8. The method of claim 7 further comprising controlling, based on the second statistical distribution, a process for at least one of producing workpieces, processing workpieces, producing arrangements of workpieces, and processing arrangements of workpieces.

9. The method of claim 7 further comprising determining, based on the second statistical distribution, a quality of a process for at least one of producing workpieces, processing workpieces, producing arrangements of workpieces, and processing arrangements of workpieces.

10. The method of claim 1 further comprising ascertaining a boundary of the set from a value interval defining the set of all those statistical distributions that are able to describe a frequency of measurement data values in the entire value interval.

11. The method of claim 10 wherein:
value pairs of the skewness and the kurtosis of statistical distributions corresponding to the set are ascertained from the value interval; and
a boundary curve in a plane spanned by the skewness and the kurtosis of statistical distributions corresponding to the set is ascertained from the value interval.

12. The method of claim 1 wherein value pairs of the skewness and the kurtosis of statistical distributions corresponding to the set are ascertained from a value interval defining the set of all those statistical distributions that are able to describe a frequency of measurement data values in the entire value interval.

13. A system for evaluating a plurality of workpieces, the system comprising:
a set of sensors coupled to a set of coordinate measuring machines, wherein:
the set of sensors is configured to generate measurement data values,
the measurement data values represent coordinate data of the plurality of workpieces,
the set of sensors includes at least one of a tactile sensor, an optical sensor, a capacitive sensor, an inductive sensor, a time-of-flight sensor, and a chromatic confocal sensor, and
the set of coordinate measuring machines includes at least one of:
a coordinate measuring machine having the at least one of the set of sensors fixedly positioned in a measurement space of the coordinate measuring machine,
a portal-type coordinate measuring machine,
a gantry-type coordinate measuring machine,
a coordinate measuring machine having an articulated arm,
a robotic coordinate measuring machine, and
a machine tool;
a definition device configured to:
access a sample set of the measurement data values, and
define a set of statistical distributions that are continuous probability distributions and that are capable of describing a probability of the sample set of measurement data values over an entire data range of the sample set of the measurement data values, wherein the entire data range contains all data values of the sample set of the measurement data values;
a moment ascertainment device configured to parse the sample set of measurement data values to determine a skewness value and a kurtosis value, wherein the skewness value and the kurtosis value are moments of an empirical statistical distribution having discrete data values; and
a checking device configured to:
parse the set of statistical distributions to determine whether the set of statistical distributions includes a statistical distribution that has the skewness value and the kurtosis value, and
in response to determining that the set of statistical distributions includes a statistical distribution having the skewness value and the kurtosis value, produce a test result, wherein the test result indicates at least one of:
whether a process in which the plurality of workpieces have been produced is controllable, and
whether a predetermined quality criterion for the process is fulfilled or not fulfilled with regard to a frequency distribution of the measurement data values,
wherein the system is configured to, responsive to the test result, at least one of produce workpieces, process workpieces, produce arrangements of workpieces, and process arrangements of workpieces.

14. The system of claim 13 further comprising:
a distribution ascertainment device configured to:
ascertain a first statistical distribution of the measurement data values, and
ascertain a second statistical distribution for the measurement data values in response to the test result indicating that the set of statistical distributions does not include a statistical distribution having the skewness value and the kurtosis value;
wherein the second statistical distribution is a statistical distribution selected from the defined set.

15. The system of claim 14 wherein:
the distribution ascertainment device is configured to ascertain the second statistical distribution in such a way that, based on a measure of distance defined for two statistical distributions in each case, the value of the measure of distance of the first statistical distribution or a distribution corresponding to the first statistical distribution from the second statistical distribution is a minimum of the measure of distance of the distance of the first statistical distribution or the corresponding distribution from the statistical distributions in the defined set; and
the measure of distance describes a distance between two statistical distributions in each case, which are able to describe a frequency of measurement data values as a function of the measurement data values.

16. The system of claim 13 wherein the definition device is configured to ascertain a boundary of the set from a value interval defining the set of all those statistical distributions that are able to describe a frequency of measurement data values in the entire value interval.

17. The system of claim 16 wherein:
the definition device is configured to ascertain value pairs of the skewness and the kurtosis of statistical distributions corresponding to the set from the value interval when defining the set of all those statistical distributions that are able to describe a frequency of measurement data values in the entire value interval; and
the definition device is configured to ascertain a boundary curve in a plane spanned by the skewness and the kurtosis of statistical distributions corresponding to the set from the value interval when defining the set of all those statistical distributions that are able to describe a frequency of measurement data values in the entire value interval.

18. The system of claim 13 wherein the definition device is configured to ascertain value pairs of the skewness and the kurtosis of statistical distributions corresponding to the set from a value interval defining the set of all those statistical distributions that are able to describe a frequency of measurement data values in the entire value interval.

19. A computer-executed method for preparing an evaluation of a sample of measurement data from measuring a plurality of workpieces by a set of coordinate measuring machines, a system of statistical distributions being configured to describe a frequency of measurement data values as a function of the measurement data values, examples of the system of statistical distributions being distinguishable from one another by respectively one moment value of two moments of the respective statistical distribution, the two moments being a skewness and a kurtosis, the method comprising:
accessing a sample set of the measurement data values at a definition device;
defining, at the definition device, a set of statistical distributions that are continuous probability distributions and that are capable of describing a probability of the sample set of the measurement data values over an entire data range of the sample set of the measurement data values, wherein the entire data range contains all data values of the sample set of the measurement data values;
parsing, at a moment ascertainment device, the sample set of measurement data values to determine a skewness value and a kurtosis value, wherein the skewness value and the kurtosis value are moments of an empirical statistical distribution having discrete data values;
parsing, at a checking device, the set of statistical distributions to determine whether the set of statistical distributions includes a statistical distribution that has the skewness value and the kurtosis value;
in response to determining that the set of statistical distributions includes a statistical distribution having the skewness value and the kurtosis value, producing a test result, wherein the test result indicates at least one of:
whether a process in which the plurality of workpieces have been produced is controllable, and
whether a predetermined quality criterion for the process is fulfilled or not fulfilled with regard to a frequency distribution of the measurement data values;
wherein:
the measurement data values are generated by a set of sensors coupled to the set of coordinate measuring machines,
the measurement data values represent coordinate data of the plurality of workpieces,
the set of sensors includes at least one of a tactile sensor, an optical sensor, a capacitive sensor, an inductive sensor, a time-of-flight sensor, and a chromatic confocal sensor, and
the set of coordinate measuring machines includes at least one of:
a coordinate measuring machine having the at least one of the set of sensors fixedly positioned in a measurement space of the coordinate measuring machine,
a portal-type coordinate measuring machine,
a gantry-type coordinate measuring machine,
a coordinate measuring machine having an articulated arm,
a robotic coordinate measuring machine, and
a machine tool; and
responsive to the test result, at least one of producing workpieces, processing workpieces, producing arrangements of workpieces, and processing arrangements of workpieces.

20. The method of claim 19 further comprising ascertaining a boundary of the set from the value interval when defining the set of all those statistical distributions that are able to describe a frequency of measurement data values in the entire value interval.

21. The method of claim 20 further comprising:
ascertaining value pairs of the skewness and the kurtosis of statistical distributions of the system, which correspond to the set, from the value interval when defining the set of all those statistical distributions that are able to describe a frequency of measurement data values in the entire value interval; and
ascertaining a boundary curve in a plane spanned by the skewness and the kurtosis of statistical distributions of the system from the value interval when defining the set of all those statistical distributions that are able to describe a frequency of measurement data values in the entire value interval.

22. The method of claim 19 further comprising ascertaining value pairs of the skewness and the kurtosis of statistical distributions of the system, which correspond to the set, from the value interval when defining the set of all those statistical distributions that are able to describe a frequency of measurement data values in the entire value interval.

23. A system for preparing an evaluation of a sample of measurement data from measuring a plurality of workpieces, a system of statistical distributions being configured to describe a frequency of measurement data values as a function of the measurement data values, examples of the system of statistical distributions being distinguishable from one another by respectively one moment value of two moments of the respective statistical distribution, the two moments being a skewness and a kurtosis, the system comprising:
a definition device configured to:
access a sample set of the measurement data values, and
define a set of statistical distributions that are continuous probability distributions and that are capable of describing a probability of the sample set of the measurement data values over an entire data range of the sample set of the measurement data values, wherein the entire data range contains all data values of the sample set of the measurement data values;

a moment ascertainment device configured to parse the sample set of the measurement data values to determine a skewness value and a kurtosis value, wherein the skewness value and the kurtosis value are moments of an empirical statistical distribution having discrete data values; and a checking device configured to:
    parse the set of statistical distributions to determine whether the set of statistical distributions includes a statistical distribution that has the skewness value and the kurtosis value, and
    in response to determining that the set of statistical distributions includes a statistical distribution having the skewness value and the kurtosis value, produce a test result, wherein the test result indicates at least one of:
        whether a process in which the plurality of workpieces have been produced is controllable, and
        whether a predetermined quality criterion for the process is fulfilled or not fulfilled with regard to a frequency distribution of the measurement data values;

wherein:
    the measurement data values are generated by a set of sensors coupled to a set of coordinate measuring machines,
    the measurement data values represent coordinate data of the plurality of workpieces,
    the set of sensors includes at least one of a tactile sensor, an optical sensor, a capacitive sensor, an inductive sensor, a time-of-flight sensor, and a chromatic confocal sensor,
    the set of coordinate measuring machines includes at least one of:
        a coordinate measuring machine having the at least one of the set of sensors fixedly positioned in a measurement space of the coordinate measuring machine,
        a portal-type coordinate measuring machine,
        a gantry-type coordinate measuring machine,
        a coordinate measuring machine having an articulated arm,
        a robotic coordinate measuring machine, and
        a machine tool; and
    the system is configured to, responsive to the test result, at least one of produce workpieces, process workpieces, produce arrangements of workpieces, and process arrangements of workpieces.

24. The system of claim 23 wherein the definition device is configured to ascertain a boundary of the set from the value interval when defining the set of all those statistical distributions that are able to describe a frequency of measurement data values in the entire value interval.

25. The system of claim 24 wherein:
    the definition device is configured to ascertain value pairs of the skewness and the kurtosis of statistical distributions of the system, which correspond to the set, from the value interval when defining the set of all those statistical distributions that are able to describe a frequency of measurement data values in the entire value interval; and
    the definition device is configured to ascertain a boundary curve in a plane spanned by the skewness and the kurtosis of statistical distributions of the system from the value interval when defining the set of all those statistical distributions that are able to describe a frequency of measurement data values in the entire value interval.

26. The system of claim 23 wherein the definition device is configured to ascertain value pairs of the skewness and the kurtosis of statistical distributions of the system, which correspond to the set, from the value interval when defining the set of all those statistical distributions that are able to describe a frequency of measurement data values in the entire value interval.

27. A non-transitory computer-readable medium storing processor-executable instructions, wherein the processor-executable instructions include:
    generating measurement data values by measuring a plurality of workpieces using at least one of a set of sensors coupled to at least one of a set of coordinate measuring machines, wherein:
        the measurement data values represent coordinate data of the plurality of workpieces,
        the set of sensors includes at least one of a tactile sensor, an optical sensor, a capacitive sensor, an inductive sensor, a time-of-flight sensor, and a chromatic confocal sensor, and
        the set of coordinate measuring machines includes at least one of:
            a coordinate measuring machine having the at least one of the set of sensors fixedly positioned in a measurement space of the coordinate measuring machine,
            a portal-type coordinate measuring machine,
            a gantry-type coordinate measuring machine,
            a coordinate measuring machine having an articulated arm,
            a robotic coordinate measuring machine, and
            a machine tool;
    accessing a sample set of the measurement data values at a definition device;
    defining, at the definition device, a set of statistical distributions that are continuous probability distributions and that are capable of describing a probability of the sample set of the measurement data values over an entire data range of the sample set of the measurement data values, wherein the entire data range contains all data values of the sample set of the measurement data values;
    parsing, at a moment ascertainment device, the sample set of the measurement data values to determine a skewness value and a kurtosis value, wherein the skewness value and the kurtosis value are moments of an empirical statistical distribution having discrete data values;
    parsing, at a checking device, the set of statistical distributions to determine whether the set of statistical distributions includes a statistical distribution that has the skewness value and the kurtosis value;
    in response to determining that the set of statistical distributions includes a statistical distribution having the skewness value and the kurtosis value, producing a test result, wherein the test result indicates at least one of:
        whether a process in which the plurality of workpieces have been produced is controllable, and
        whether a predetermined quality criterion for the process is fulfilled or not fulfilled with regard to a frequency distribution of the sample set of the measurement data values; and responsive to the test result, at least one of producing workpieces, processing workpieces, producing arrangements of workpieces, and processing arrangements of workpieces.

\* \* \* \* \*

UNITED STATES PATENT AND TRADEMARK OFFICE
CERTIFICATE OF CORRECTION

| | |
|---|---|
| PATENT NO. | : 11,822,321 B2 |
| APPLICATION NO. | : 17/332930 |
| DATED | : November 21, 2023 |
| INVENTOR(S) | : Oliver Rüger et al. |

It is certified that error appears in the above-identified patent and that said Letters Patent is hereby corrected as shown below:

In the Claims

Claim 7, Column 25, Lines 13-14 "distance of the distance of the" should be --distance of the--

Claim 15, Column 26, Line 57-58 "distance of the distance of the" should be --distance of the--

Signed and Sealed this
Twenty-sixth Day of March, 2024

Katherine Kelly Vidal
*Director of the United States Patent and Trademark Office*